(12) United States Patent
Wong et al.

(10) Patent No.: US 12,073,476 B2
(45) Date of Patent: Aug. 27, 2024

(54) INFORMATION PROCESSING SYSTEM

(71) Applicant: Wacom Co., Ltd., Saitama (JP)

(72) Inventors: Henry Wong, Portland, OR (US); Kaelin Chang, Portland, OR (US); Jun Kadowaki, Saitama (JP); Isao Maruoka, Saitama (JP); Peter Bacher, Portland, OR (US); Avinav Khanal, Duesseldorf (DE); Toru Eguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 302 days.

(21) Appl. No.: 17/448,510

(22) Filed: Sep. 22, 2021

(65) Prior Publication Data
US 2022/0005130 A1   Jan. 6, 2022

Related U.S. Application Data

(63) Continuation of application No. PCT/JP2020/003907, filed on Feb. 3, 2020.

(30) Foreign Application Priority Data

Apr. 5, 2019   (JP) ................. 2019-072567

(51) Int. Cl.
*G06Q 50/12*   (2012.01)
*G06F 3/0488*   (2022.01)
(Continued)

(52) U.S. Cl.
CPC .......... *G06Q 50/12* (2013.01); *G06F 3/0488* (2013.01); *G06F 3/14* (2013.01); *G06F 16/90335* (2019.01); *G06V 20/00* (2022.01)

(58) Field of Classification Search
CPC . G06Q 50/12; G06F 16/90335; G06F 3/0488; G06F 3/14
See application file for complete search history.

(56) References Cited

U.S. PATENT DOCUMENTS

2002/0138584 A1   9/2002   Fujimoto et al.
2016/0026425 A1   1/2016   Lee et al.
(Continued)

FOREIGN PATENT DOCUMENTS

JP   2002-351789 A   12/2002
JP   2005253850 A   9/2005
(Continued)

OTHER PUBLICATIONS

Jamboard—the whiteboard, reimagined for collaboration in the cloud, 2016, https://blog.google/products/g-suite/jamboard-whiteboard-reimagined-collaboration-cloud/). (Year: 2016).*

(Continued)

*Primary Examiner* — Allen C Chein
(74) *Attorney, Agent, or Firm* — Seed IP Law Group LLP

(57) ABSTRACT

An information processing system includes an information processing device, a food material stock managing device disposed in a food material storage device, and a meal condition detecting device. The information processing device includes a display device including a display screen, a first communicating circuit that communicates with a portable terminal of a target person, a second communicating circuit that communicates with the food material stock managing device, a third communicating circuit that communicates with the meal condition detecting device, a processor, and a memory storing instructions that cause the information processing device to generate information regarding proposed food to be provided to the target person based on information obtained from the first, second, and third communicating circuits, and display the information regarding the proposed food to be provided to the target person on the display screen of the display device.

18 Claims, 17 Drawing Sheets

(51) Int. Cl.
  *G06F 3/14*      (2006.01)
  *G06F 16/903*    (2019.01)
  *G06V 20/00*     (2022.01)

(56) References Cited

U.S. PATENT DOCUMENTS

| | | |
|---|---|---|
| 2017/0354231 A1 | 12/2017 | Okumura et al. |
| 2018/0033074 A1 | 2/2018 | Grueneberg et al. |
| 2018/0232785 A1 | 8/2018 | Iyer et al. |
| 2019/0073601 A1* | 3/2019 | Alkan .................... G06N 20/00 |
| 2019/0125113 A1* | 5/2019 | Chung ............... G01G 19/4146 |
| 2020/0088463 A1* | 3/2020 | Jeong ..................... G06F 3/167 |

FOREIGN PATENT DOCUMENTS

| | | |
|---|---|---|
| JP | 2013025333 A | 2/2013 |
| JP | 2013-250699 A | 12/2013 |
| JP | 2015-81762 A | 4/2015 |
| JP | 2015-153286 A | 8/2015 |
| JP | 2017-221640 A | 12/2017 |

OTHER PUBLICATIONS

Howard, "A Comparison of Inductive and Capacitive Position Sensors", 2016, https://www.fierceelectronics.com/components/a-comparison-inductive-and-capacitive-position-sensors (Year: 2016).*
Zhou, "Smart Table Surface: A Novel Approach to Pervasive Dining Monitoring", 2015 (Year: 2015).*
International Search Report, mailed Mar. 31, 2020, for International Application No. PCT/JP2020/003907, 3 pages.

* cited by examiner

FIG. 5

TABLE INFORMATION TBL

| | AREA NAME | PARTIAL DISPLAY AREA | PARTIAL INPUT AREA | ELECTRONIC MAIL ADDRESS | IDENTIFICATION INFORMATION |
|---|---|---|---|---|---|
| AR1 | FATHER | Ds1, Ds2 | Ps1, Ps2 | ○······@······ | ID1 |
| AR2 | MOTHER | Ds3, Ds4 | Ps3, Ps4 | ×······@······ | ID2 |
| AR3 | ELDER SISTER | Ds5, Ds6 | Ps5, Ps6 | △······@······ | ID3 |
| AR4 | TARO | Ds7, Ds8 | Ps7, Ps8 | □······@······ | ID4 |
| AR5 | COMMON | Ds9, Ds10 | Ps9, Ps10 | ○······@······<br>×······@······<br>△······@······<br>□······@······ | ID5 |

INFORMATION PROCESSING SYSTEM

BACKGROUND

Technical Field

The present disclosure relates to an information processing system that can, for example, assist in providing appropriate food to a family.

Background Art

When food is to be provided for a family, for example, a person who intends to provide the food determines the food to be provided in consideration of food materials present in a refrigerator, the health states of the family, likes and dislikes (preferences) of each family member, and a schedule of each family member.

However, it is troublesome for the person who intends to provide the food to collect those pieces of information to be considered by himself/herself. Accordingly, each of the family members may be requested to send an electronic mail, and the electronic mails may be considered. In that case, it is convenient when the electronic mails of all of the family members can be viewed on one display screen at the same time, instead of individually viewing and considering the electronic mails of all of the family members. For example, Japanese Patent Laid-Open No. 2002-351789 (hereinafter, referred to as Patent Document 1) proposes providing a plurality of electronic mail display areas on a display screen, so that transmission and reception processing can be performed while messages, destinations, senders, titles, and the like of the plurality of electronic mails are checked at the same time. When this Patent Document 1 is used, it is convenient that the electronic mails from the family members can be viewed at the same time.

However, in Patent Document 1, the plurality of electronic mails are displayed on the display screen in random order, and display information on transmission sources needs to be checked to determine which electronic mail is an email from which of the family members. It therefore takes trouble to grasp the information of the electronic mails of the family members.

In addition, though the schedule of each family member can be requested to be notified by the electronic mails, the person who performs cooking needs to inquire about health states such as physical conditions one by one by the electronic mails, which is troublesome. In addition, the person who performs cooking needs to remember preferences of each family member in foods, and when the preferences are changed, it is difficult to deal with the change.

BRIEF SUMMARY

It is an object of the present disclosure to provide an information processing system that can solve the above problems.

In order to solve the above problems, there is provided an information processing system including an information processing device, a food material stock managing device disposed in a food material storage device which, in operation, stores food materials, and a meal condition detecting device which, in operation, detects behavior of a predetermined target person while the target person is eating provided food. The information processing device includes a display device including a display screen, a first communicating circuit which, in operation, communicates with a portable terminal carried by the target person, a second communicating circuit which, in operation, communicates with the food material stock managing device, a third communicating circuit which, in operation, communicates with the meal condition detecting device, a processor coupled to the first communication circuit, the second communication circuit, and the third communication circuit, and a memory storing instructions that, when executed by the processor, cause the information processing device to generate information regarding proposed food to be provided to the target person based on information obtained from the first communicating circuit, information obtained from the second communicating circuit, and information obtained from the third communicating circuit, and display the information regarding the proposed food to be provided to the target person on the display screen of the display device.

According to the above-described information processing system, the information regarding the proposed food to be provided to the target person generated based on the information obtained from the first communicating circuit, the information obtained from the second communicating circuit, and the information obtained from the third communicating circuit is displayed on the display device. Hence, it is convenient that a person who intends to provide the food can provide actual food on the basis of the food information displayed on the display screen of the information processing device of the information processing system.

BRIEF DESCRIPTION OF THE DRAWINGS

FIG. 5 depicts an example of table information possessed by the information processing device constituting the information processing system according to the embodiment of FIG. 1;

DETAILED DESCRIPTION

Figure 1:
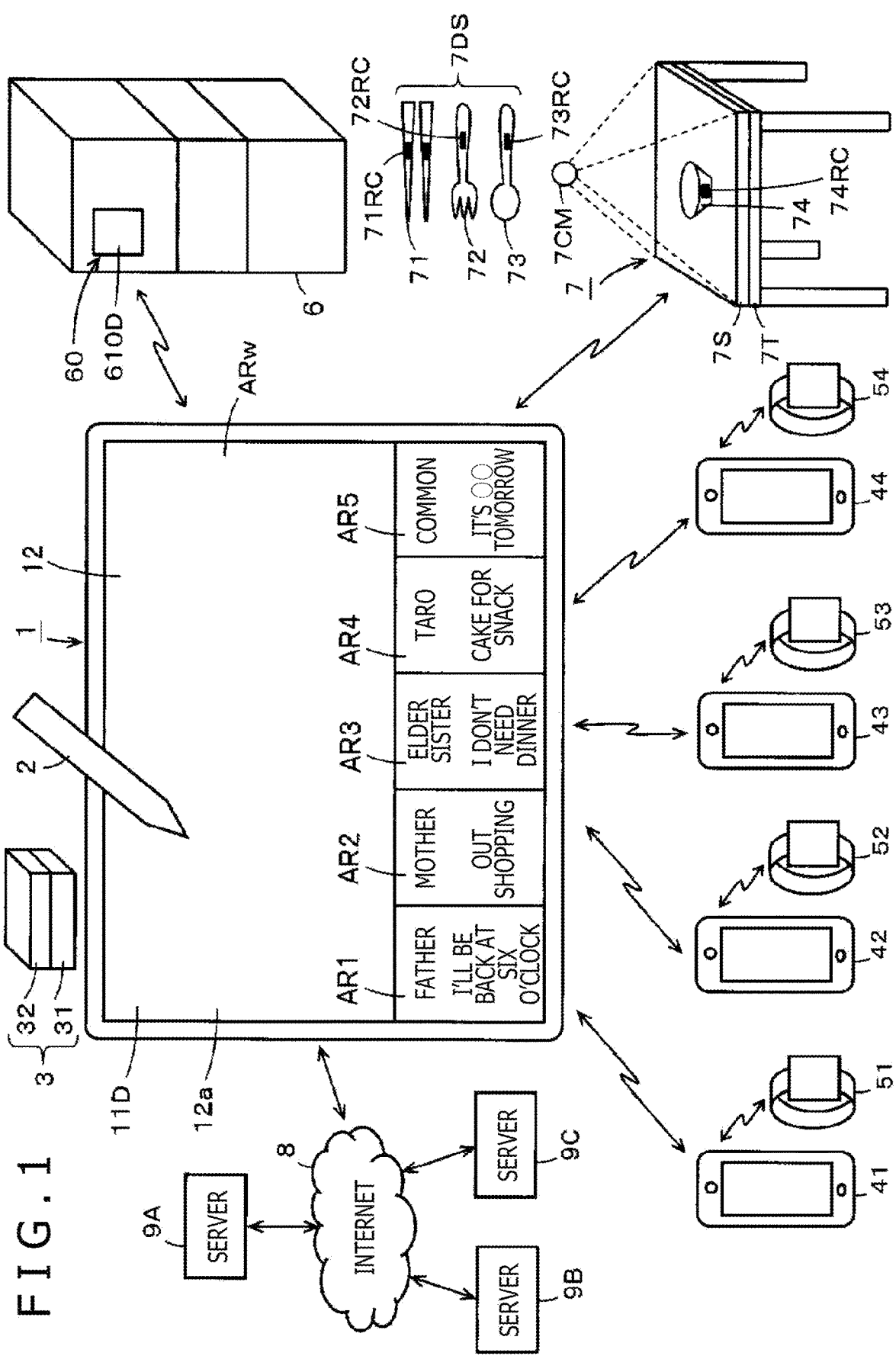
FIG. 1 is a diagram of assistance in explaining an example of a configuration of an information processing system and an outline of a usage mode according to an embodiment of the present disclosure.

An embodiment of an information processing system according to the present disclosure will hereinafter be described with reference to the drawings. FIG. 1 is a diagram of assistance in explaining an example of a configuration of an embodiment of an information processing system according to the present disclosure. As depicted in FIG. 1, the information processing system according to the present embodiment is formed by providing a marker-equipped position indicator 2 as an example of a position indicator and an eraser functional member 3 to an information processing device 1 and connecting portable terminals 41 to 44, a food material stock managing device 60 provided to a refrigerator 6 as an example of a food material storage device, and a meal condition detecting device 7 to the information processing device 1 by wireless communication. In addition, each of the portable terminals 41 to 44 is configured to perform wireless communication with a corresponding one of wearable terminals 51 to 54 worn by persons carrying the portable terminals 41 to 44.

Further, the information processing device 1 is configured to connect to server devices 9A, 9B, and 9C, and other devices through the Internet 8.

Description of Example of Configuration of Information Processing Device 1

Figure 2:
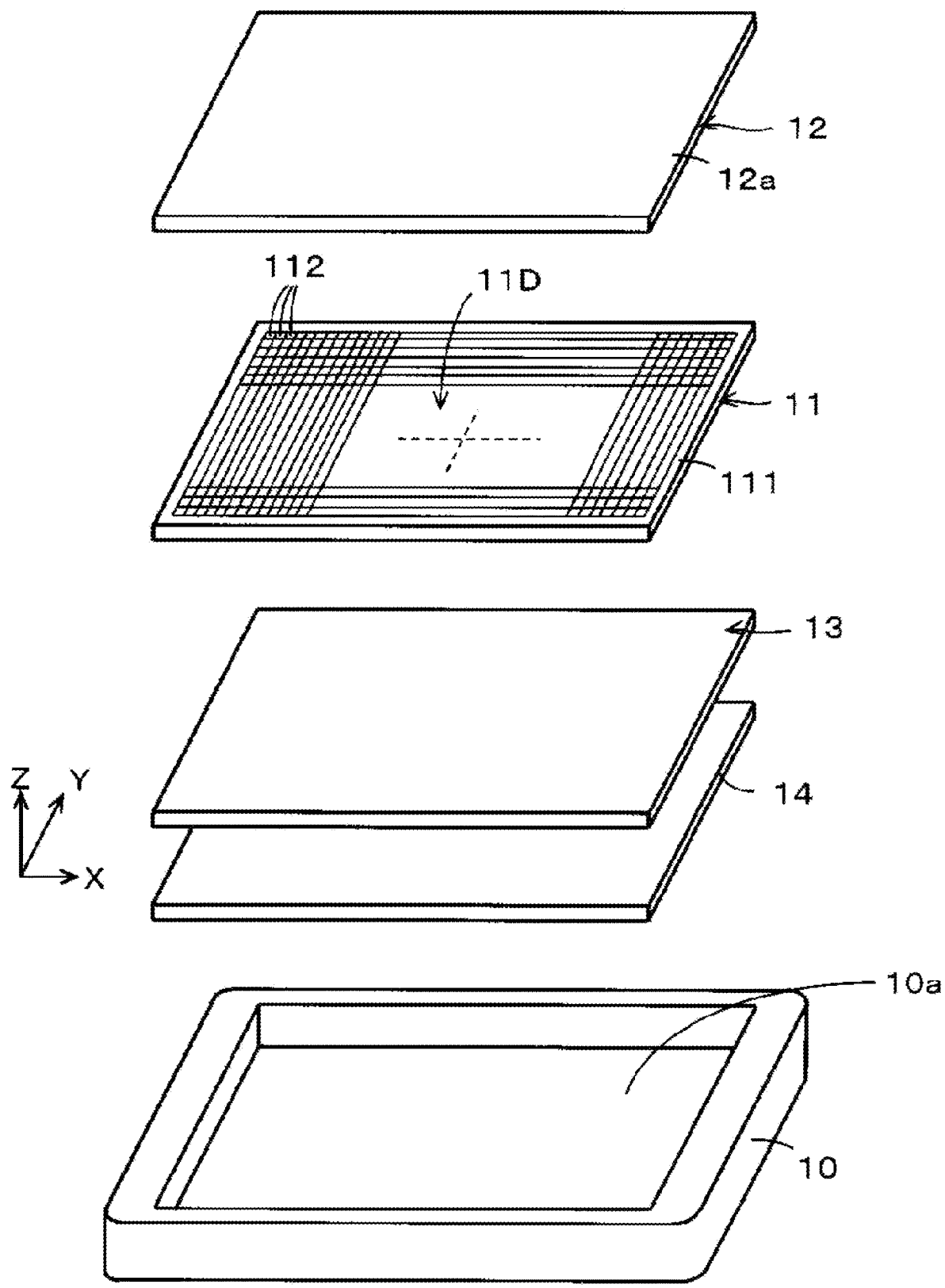
FIG. 2 is an exploded perspective view depicting a hardware configuration example of an information processing device constituting the information processing system according to the embodiment of FIG. 1.

FIG. 2 is an exploded perspective view depicting an example of a configuration of the information processing device 1 constituting the information processing system according to the present embodiment.

As depicted in FIG. 2, the information processing device 1 in the present example is configured such that the following are housed in a case 10 so as to be superposed on one another: a display device 11; a transparent panel 12 constituting a cover member disposed in a superposed manner so as to cover an upper portion (display surface side) of a display screen of the display device; a position detecting sensor 13 disposed under (on the back side of) the display device 11; and a control circuit board 14 constituting an electronic circuit part of the information processing device 1.

The case 10 is, for example, formed by a synthetic resin. The case 10 has a recessed portion 10a for housing the display device 11, the transparent panel 12, the position detecting sensor 13, and the control circuit board 14.

The display device 11 is formed by a flat display of a large size, for example, 40 inches or more, which display is constituted of a liquid crystal display, an organic electroluminescence (EL) display, or the like. The display device 11 has, on a display substrate 111, a display screen 11D including a large number of display pixels 112 arranged in an X-axis direction (horizontal direction) and a large number of display pixels 112 arranged in a Y-axis direction (vertical direction) orthogonal to the X-axis direction.

The transparent panel 12 in the present example is formed by a transparent material, for example, a transparent acrylic board that allows writing and drawing using ink to be performed by a marker pen of the position indicator 2 and allows the writing and the drawing to be erased by the eraser functional member 3. The transparent panel 12 in the present example has a same size as the display screen 11D of the display device 11. The side of a front surface 12a of the transparent panel 12 is an operating surface for position indication by the position indicator 2.

Under (on the back side of) the display device 11, in the present example, the position detecting sensor 13 of an electromagnetic induction type is disposed such that a position detection area of the position detecting sensor 13 is precisely superposed on the display screen 11D. In the present example, a detection area of the position detecting sensor 13 which detection area is for detecting a position indicated by the position indicator 2 to be described later and a display area of the display screen 11D of the display device 11 are of a same size, and the display device 11 and the position detecting sensor 13 are arranged such that both areas are precisely superposed on each other.

The control circuit board 14 is disposed on the back side of the position detecting sensor 13. The control circuit board 14 is electrically connected to the display device 11 and the position detecting sensor 13.

The information processing device 1 according to the present embodiment is accompanied by the marker-equipped position indicator 2 that can perform position indication by electromagnetic induction coupling to the position detecting sensor 13 and perform ink writing on the front surface 12a of the transparent panel 12 and the eraser functional member 3 that can erase a writing trace of the ink writing by the marker-equipped position indicator 2 from the front surface 12a of the transparent panel 12 and can send out an instruction to delete corresponding writing data to the position detecting sensor 13.

Figure 3:
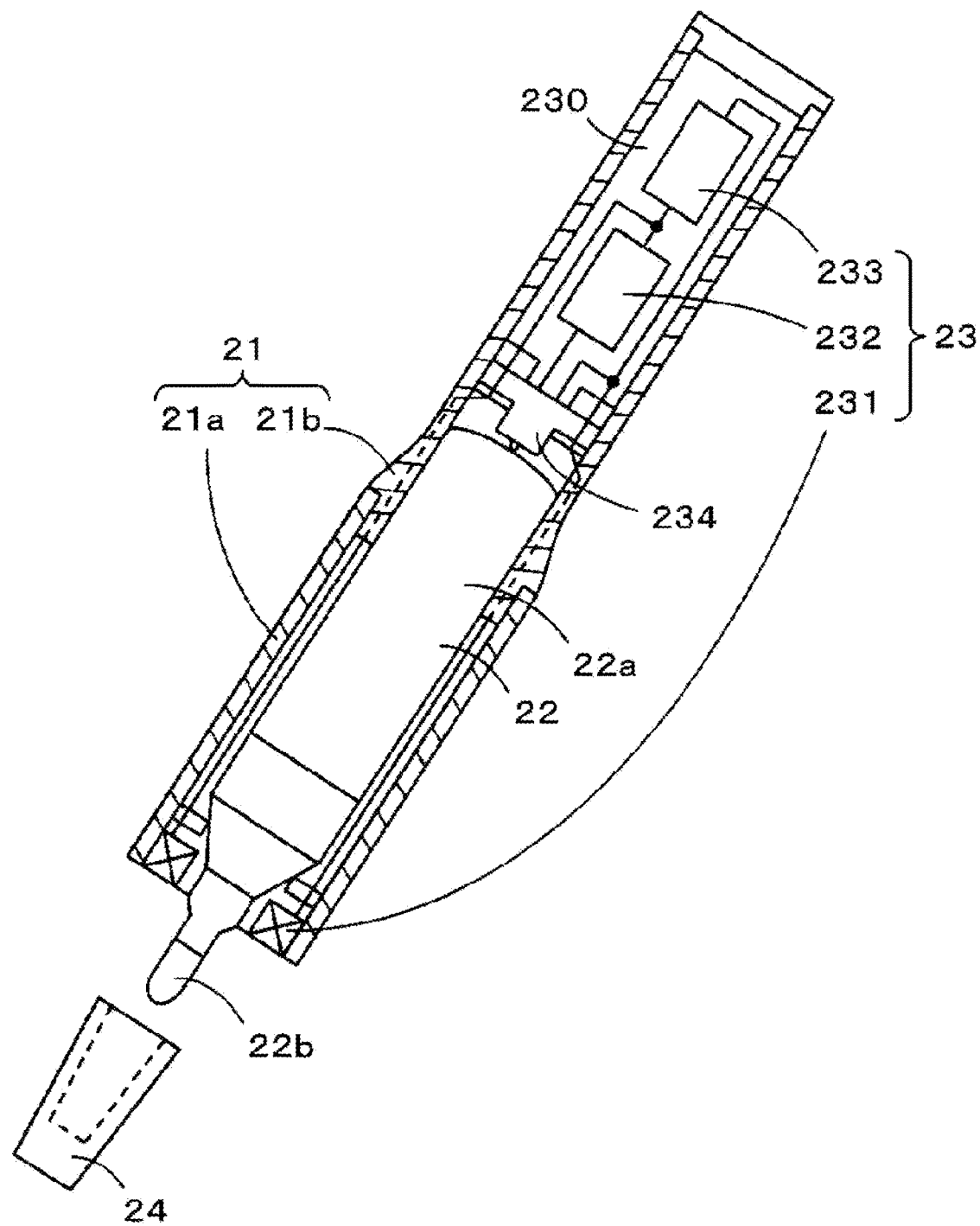
FIG. 3 is a diagram of assistance in explaining an example of a position indicator used in conjunction with the information processing device constituting the information processing system according to the embodiment of FIG. 1.

FIG. 3 depicts an example of a configuration of the marker-equipped position indicator 2. The marker-equipped position indicator 2 in the present example is formed by providing a marker pen body 22 and an interaction circuit 23 that performs signal interaction with the position detecting sensor 13 within a case 21 constituted of a tip end side case 21a and a rear end side case 21b coupled to each other in a screwing manner.

The marker pen body 22 has a configuration in which ink stored in an ink storage portion 22a is supplied to a pen tip member 22b formed of felt, for example. The marker pen body 22 is thus similar to a commercially available felt pen. A cap 24 is fitted to the pen tip member 22b.

The interaction circuit 23 is formed by a resonance circuit including a coil 231 and capacitors 232 and 233. As depicted in FIG. 3, the coil 231 is disposed in the vicinity of the pen tip member 22b of the marker pen body 22 in the tip end side case 21a. The capacitors 232 and 233 are arranged on a printed circuit board 230 provided on a rear end side of the ink storage portion 22a of the marker pen body 22 in the rear end side case 21b.

The printed circuit board 230 is provided with a switch 234 such that the switch 234 is opposed to a tail portion of the ink storage portion 22a of the marker pen body 22. The switch 234 is turned on and off by displacement of the marker pen body 22 in an axial direction to control whether or not to connect the capacitor 233 to the resonance circuit. When a pressure applied to the pen tip member 22b of the marker pen body 22 is equal to or lower than a predetermined value at a time of ink writing by the pen tip member 22b of the marker pen body 22, the switch 234 is off, and the capacitor 233 is disconnected from the resonance circuit. When a pressure exceeding the predetermined value is applied, the switch 234 is turned on, and the capacitor 233 is connected to the resonance circuit, so that the resonance frequency of the resonance circuit is changed.

The changing of the resonance frequency by turning on and off the switch 234 can, for example, be used for an instruction as to whether or not to erase writing data corresponding to stored ink writing at the same time when the ink writing formed on the front surface 12a of the transparent panel 12 by the marker pen body 22 is erased by the eraser functional member 3. For example, an instruction can be given to erase the writing data corresponding to the ink writing formed by the marker pen body 22 at the same time in a state in which the switch 234 is off, or to retain the writing data corresponding to the ink writing formed by the marker pen body 22 in a memory without erasing the writing data in a state in which the switch 234 is on with a pressure applied to the pen tip portion 22b of the marker-equipped position indicator 2.

The eraser functional member 3 includes an eraser circuit 31 formed by a member for erasing, by friction, a writing trace written in ink on the front surface 12a of the transparent panel 12 by the marker-equipped position indicator 2, and an interaction circuit 32 for interacting with the position detecting sensor 13 to erase corresponding writing data. The eraser circuit 31 is formed of a well-known fiber material or the like. The interaction circuit 32 is formed by providing a resonance circuit including a coil and a capacitor within a holder that holds the eraser circuit 31.

Figure 4:
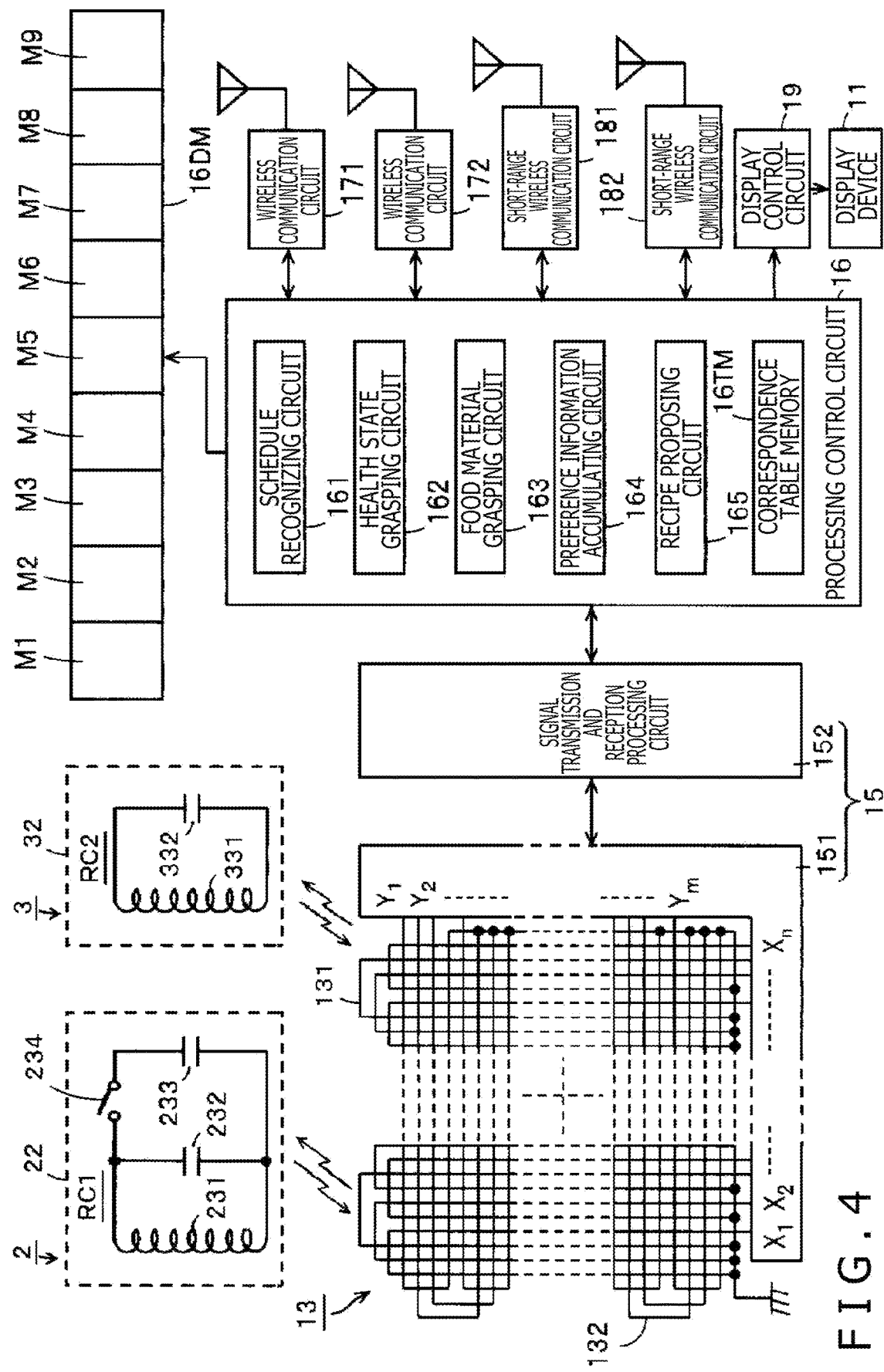
FIG. 4 is a diagram depicting an example of a configuration of an electronic circuit of the information processing device constituting the information processing system according to the embodiment of FIG. 1.

FIG. 4 is a diagram depicting an example of a configuration of an electronic circuit formed on the above-described control circuit board 14 including connection relation to the position detecting sensor 13 and the display device 11. In addition, this FIG. 4 also depicts interaction relation of the position detecting sensor 13 with the marker-equipped position indicator 2 and the eraser functional member 3.

An upper left of FIG. 4 depicts an example of a circuit configuration of the interaction circuit 23 of the marker-equipped position indicator 2 and an example of a circuit configuration of the interaction circuit 32 of the eraser functional member 3. Specifically, the interaction circuit 23 of the marker-equipped position indicator 2 has a configuration of a resonance circuit RC1 in which the coil 231 and the capacitor 232 are connected in parallel with each other and the capacitor 233 is further connected in parallel via the switch 234. The resonance frequency of the resonance circuit RC1 differs between a time that the switch 234 is off and a time that the switch 234 is on.

The interaction circuit 32 of the eraser functional member 3 has a configuration of a resonance circuit RC2 in which a coil 321 and a capacitor 322 are connected in parallel with each other. The resonance frequency of the parallel resonance circuit RC2 is configured to be different from the resonance frequency of the resonance circuit RC1.

The resonance circuit RC1 of the marker-equipped position indicator 2 and the resonance circuit RC2 of the eraser functional member 3 perform signal exchange (interaction) with the position detecting sensor 13 by electromagnetic induction coupling.

Meanwhile, as depicted in FIG. 4, provided on the control circuit board 14 are a position detecting circuit 15, a processing control circuit 16, a wireless communication circuit 171 that performs wireless communication with the server devices 9A, 9B, and 9C through the Internet 8 in the present example, a wireless communication circuit 172 that performs wireless communication with the portable terminals 41 to 44, a short-range wireless communication circuit 181 that performs wireless communication with the food material stock managing device 60, a short-range wireless communication circuit 182 that performs wireless communication with the meal condition detecting device 7, and a display control circuit 19. The short-range wireless communication circuits 181 and 182 in the present example perform wireless communication of a Bluetooth (registered trademark) standard.

In one or more embodiments, the processing control circuit 16 incudes a processor and a memory storing instructions that, when executed by the processor, cause the processing control circuit 16 to perform the functions described herein. For example, the processing control circuit 16 includes a Central Processing Unit (CPU).

The position detecting circuit 15 in the present example includes a selecting circuit 151 connected to the position detecting sensor 13 and a signal transmission and reception processing circuit 152 connected to the selecting circuit 151 and connected to the processing control circuit 16.

The position detecting sensor 13 in the present example is formed by position detecting coils obtained by stacking an X-axis direction loop coil group 131 and a Y-axis direction loop coil group 132. Each of loop coils of the X-axis direction loop coil group 131 and the Y-axis direction loop coil group 132 is connected to the selecting circuit 151. The selecting circuit 151 sequentially selects one loop coil of the two loop coil groups 131 and 132 by performing selection processing based on a control signal from a control circuit included in the signal transmission and reception processing circuit 152, transmits a signal from the signal transmission and reception processing circuit 152 to the resonance circuits of the position indicator 2 and the eraser functional member 3 to be described later, and receives signals fed back from those resonance circuits and supplies the signals to the signal transmission and reception processing circuit 152.

The signal transmission and reception processing circuit 152 of the position detecting circuit 15 detects a position on the position detecting sensor 13 which position is indicated at the same time as ink writing performed by the marker-equipped position indicator 2 from a position on the position detecting sensor 13 at which position a feedback signal received by electromagnetic coupling from the resonance circuit RC1 of the interaction circuit 32 of the marker-equipped position indicator 2 is detected, and supplies the processing control circuit 16 with a result of the detection as writing input information (hereinafter referred to as writing data) from the marker-equipped position indicator 2.

In addition, the signal transmission and reception processing circuit 152 of the position detecting circuit 15 detects a position on the position detecting sensor 13 at which position an erasure instruction is given by the eraser functional member 3 from a position on the position detecting sensor 13 at which position a feedback signal received by electromagnetic coupling from the resonance circuit RC2 of the interaction circuit 32 of the eraser functional member 3 is detected, and supplies the processing control circuit 16 with a result of the detection as erasure position input information from the eraser functional member 3.

The processing control circuit 16 performs processing of storing the writing data obtained from the signal transmission and reception processing circuit 152 in a memory and displaying the writing data on the display screen 11D of the display device 11. In addition, when the processing control circuit 16 obtains the erasure position input information from the signal transmission and reception processing circuit 152, the processing control circuit 16 performs processing of deleting the corresponding writing data from the memory.

In addition, in the present embodiment, the processing control circuit 16 has a function of performing communication with an external portable terminal on the basis of information from the signal transmission and reception processing circuit 152 of the position detecting circuit 15. In addition, in the present embodiment, the processing control circuit 16 is configured to be able to perform various function processing as described later by performing communication with the external portable terminals 41 to 44, the food material stock managing device 60, and the meal condition detecting device 7 and with the server devices 9A, 9B, and 9C through the Internet 8 irrespective of information from the signal transmission and reception processing circuit 152 of the position detecting circuit 15. The processing control circuit 16 is configured to perform display control on the display screen 11D at a time of this communication through the display control circuit 19.

Counterparts with which the information processing device 1 according to the present embodiment performs communication are limited to persons set in advance. The information processing device 1 according to the present embodiment is configured to set partial display areas different from each other on the display screen 11D for the respective communication counterparts set in advance, and manage communication associated with each of the partial display areas.

The information processing device 1 according to the present embodiment is installed in, for example, a living room of a house inhabited by a family including a plurality of members living together such, for example, as a father, a mother, an elder sister, and Taro. The information processing device 1 can be used by persons present in the house and persons away from the house. The information processing device 1 according to the present embodiment can communicate with a portable terminal carried by each person while the person is away from the house. In the present example, an advanced mobile telephone terminal referred to as a smart phone, for example, is used as the portable terminal. A person present in the house can use the information processing device 1 according to the present embodiment as a communication terminal. In the present example, description will be made by taking a case where communication is electronic mail communication.

The information processing device 1 according to the present embodiment has five partial display areas AR1, AR2, AR3, AR4, and AR5 set in a display area of the display screen 11D of the display device 11, as depicted in FIG. 1. These partial display areas AR1 to AR5 may be set in advance in the information processing device 1, or can be set optionally by a user. For example, the partial display areas AR1 to AR5 formed by a rectangular region can be set by specifying the positions of upper left corners and lower right corners of the respective partial display areas.

In the present embodiment, the display area of the display screen 11D and the position detection area of the position detecting sensor 13 are superimposed on each other, and a display position in the display area and a position in the detection area correspond to each other. Thus, when a position in one area is known, a corresponding position in the other area is known. Therefore, when the partial display areas are set, partial input areas corresponding to the partial display areas are automatically calculated and set in the detection area of the position detecting sensor 13.

Incidentally, in a case where an optional partial display area is set, a setting of a partial input area is received in the detection area of the position detecting sensor 13, and thereby the partial display area corresponding to the partial input area can be set. Incidentally, the number of partial display areas may be one, and is not limited to the number as in the example of the figure but may be any number. In addition, the size of the partial display area can also be set optionally, and when a plurality of partial display areas are set, the plurality of partial display areas may, of course, vary in size. In addition, the shape of an area set as a partial display area is not limited to a rectangle as in the example of the figure, but may be a circular shape or another polygonal shape.

When the setting of the partial display areas is completed, communication address information of the portable terminals 41 to 44, or electronic mail address information in the present example is set in association with the respective partial display areas. As a method of setting the electronic mail address information, writing input may be performed by the marker-equipped position indicator 2, for example, or various methods are possible, such, for example, as a method of transmitting an electronic mail from each of the portable terminals 41 to 44 to the information processing device 1 in a state in which a partial display area to be set is selected, and associating and setting the electronic mail of the transmission source.

Next, the name of each of the partial display areas AR1 to AR5 is, for example, set by writing input using the marker-equipped position indicator 2. Further, in the present embodiment, in a case where the partial display areas AR1 to AR5 are used for another particular use rather than being simply used for transmission and reception of electronic mails to and from only a specific person (individual use), the setting of the particular use is also performed in the partial display areas AR1 to AR5. A list of uses available in the information processing device 1 can be displayed in advance, and the particular use can be selected from the list. In the present example, a common use is set as a use in the partial display area AR5.

Here, the common use is set in an area used commonly by the users of the portable terminals set and registered for individual use. As will be described later, when writing is performed in the common use area by the marker-equipped position indicator 2, information regarding the performed writing is transmitted to all of the portable terminals set and registered for individual use.

When the partial display areas, the partial input areas, and corresponding electronic mail addresses are set as described above, the processing control circuit 16 stores these pieces of corresponding information in a built-in correspondence table memory 16TM in the present example. FIG. 5 depicts an example of table information TBL as stored contents of the correspondence table memory 16TM.

As depicted in FIG. 1, an area name in the table information TBL of the correspondence table memory 16TM is displayed in each of the partial display areas AR1 to AR5. Incidentally, a name "common" for a particular use is given as the area name of the partial display area AR5.

Two values (for example, (Ds1 and Ds2)) of a partial display area respectively represent a pair of the display pixel position of a left corner of the partial display area and the display pixel position of a right corner of the partial display area in the display area. In addition, two values (for example, (Ps1 and Ps2)) of a partial input area respectively represent a pair of the position of a left corner of the partial input area and the position of a right corner of the partial input area in the detection area of the position detecting sensor 13.

An electronic mail address is an electronic mail address of the portable terminal associated with each of the partial display areas AR1 to AR5, as described earlier. That is, as depicted in FIG. 1, the electronic mail address of the portable terminal 41 carried by the father is set, registered, and stored for the partial display area AR1, the electronic mail address of the portable terminal 42 carried by the mother is set, registered, and stored for the partial display area AR2, the electronic mail address of the portable terminal 43 carried by the elder sister is set, registered, and stored for the partial display area AR3, and the electronic mail address of the portable terminal 44 carried by Taro is set, registered, and stored for the partial display area AR4. In addition, the electronic mail addresses of the portable terminals 41 to 44 carried by the father, the mother, the elder sister, and Taro are set, registered, and stored for the partial display area AR5 for the common use.

In the present example, each of the partial display areas AR1 to AR5 is given identification information (Identification (ID)).

Incidentally, in the present embodiment, an application program for electronic mail communication with the information processing device 1 according to the present embodiment is installed in advance on each of the portable terminals 41 to 44 for the respective individuals.

As depicted in FIG. 1, a residual display area ARw not associated with the portable terminals is present in the display area of the display screen 11D of the display device 11 of the information processing device 1 in the present example. In the present example, the residual display area ARw is set as an optional writing input area. In addition, though not depicted, a drawing tablet device, a handwriting input device provided with a position detecting sensor, or the like connected to the information processing device 1 by short-range radio communication may be provided, and drawing data (sketching data) sent from the drawing tablet device or the handwriting input device provided with the position detecting sensor may be displayed in the residual display area ARw.

As depicted in FIG. 4, an information storage memory 16DM is further connected to the processing control circuit 16. In the present example, a storage area of the information storage memory 16DM is divided, so that the information storage memory 16DM has a plurality of storage areas M1 to M6 associated with the plurality of partial display areas AR1 to AR5 and the residual display area ARw, and has other storage areas M7 to M9 for storing information as described later.

The storage areas M1 to M6 store information to be displayed in the partial display areas AR1 to AR5 associated with the respective storage areas and writing data input by position indication by the marker-equipped position indicator 2 in the partial input areas and the residual display area ARw associated with the respective storage areas. The stored information is managed separately for each storage area. Incidentally, in the present example, in the storage areas M1 to M6, display information of the partial display areas AR1 to AR5 and the writing data of the corresponding partial input areas are stored so as to be managed separately, and the display information of the residual display area ARw and the corresponding writing data are stored so as to be managed separately.

As depicted in FIG. 4, the processing control circuit 16 is connected to the display device 11 via the display control circuit 19. The processing control circuit 16 performs display control in the partial display areas AR1 to AR5 and the residual display area ARw of the display screen 11D of the display device 11 according to the information stored in the storage areas M1 to M6 of the information storage memory 16DM.

Incidentally, bold characters in the partial display areas AR4 and AR5 on the display screen 11D of FIG. 1 represent characters written in ink by the marker-equipped position indicator 2, and the writing data of the ink writing is stored in the information storage memory 16DM. However, at a time of the writing input, only the ink writing is performed on the front surface 12*a* of the transparent panel 12, and the writing input is not displayed as display information on the display screen of the display device 11.

<Outline of Processing Operation of Processing Control Circuit 16>

The processing control circuit 16 stores information received from the portable terminals 41 to 44 through the wireless communication circuit 171 or 172 in the storage areas M1 to M4 corresponding to the partial display areas AR1 to AR4 with which the respective portable terminals 41 to 44 are associated. Then, the processing control circuit 16 generates display information of the received information, and displays the generated information in the partial display areas AR1 to AR4 corresponding to the respective portable terminals 41 to 44. Incidentally, in a case where the received information is displayed in the partial display areas AR1 to AR4 on the display screen 11D of the display device 11, and the display information is difficult to see because an ink writing on the front surface 12a of the transparent panel 12 by the marker-equipped position indicator 2 is present in a superposed manner, the display information can be made easier to see by erasing the ink writing by the eraser functional member 3.

In addition, when the processing control circuit 16 receives writing data based on indicating position input by the marker-equipped position indicator 2 detected by the position detecting circuit 15 from the signal transmission and reception processing circuit 152, the processing control circuit 16 determines in which area in the detection area of the position detecting sensor 13 the writing data is received as input information. Then, the processing control circuit 16 stores the received writing data in the storage area of the information storage memory 16DM which storage area corresponds to the determined area, and when the processing control circuit 16 determines that the determined area corresponds to any one of the partial display areas AR1 to AR4, the processing control circuit 16 transmits the received writing data to the portable terminal set in correspondence with the partial display area of a result of the determination.

When the determined partial display area is the partial display area AR5 set for the "common use," the received writing data is transmitted to all of the portable terminals 41 to 44 set in correspondence with the partial display areas AR1 to AR4. Incidentally, in the present embodiment, the writing data of writing input to the residual display area ARw is not transmitted to the portable terminals 41 to 44 at a time of writing.

In addition, in the information processing device 1 according to the present embodiment, when the marker-equipped position indicator 2 performs writing input based on position indication input in any one of the partial display areas AR1 to AR4 for individual use, it is possible to make a request to transmit (transfer) the writing data to not only the portable terminal set in correspondence with the partial display area in which the writing input is performed, but also a portable terminal set in correspondence with another partial display area (transfer request).

The processing control circuit 16 also has a function of, when detecting that an instruction for a transfer request is given on the basis of information from the signal transmission and reception processing circuit 152, performing processing of transferring the received writing data to the portable terminal specified by the transfer request.

As depicted in FIG. 4, the information processing device 1 according to the present embodiment further includes various kinds of functional processing sections, that is, a schedule recognizing section 161, a health state grasping section 162, a food material grasping section 163, a preference information accumulating section 164, and a recipe proposing section 165. Each of these sections can be implemented by an application program that is executed by a processor included in the processing control circuit 16.

The schedule recognizing section 161 recognizes the schedules of the persons carrying the respective portable terminals 41 to 44 from received information of electronic mails sent from the respective portable terminals 41 to 44. In the present example, the information of the sent electronic mails is configured such that information regarding schedules determined in advance such as information regarding times of coming home and information regarding necessities of a meal is sent as information in a specific pattern that can be readily extracted. Hence, the schedule recognizing section 161 can recognize the schedules of the persons carrying the respective portable terminals 41 to 44 from the information regarding those schedules extracted. The schedule recognizing section 161 retains the information regarding the recognized schedules in, for example, the storage area M7 of the information storage memory 16DM in association with identification information of the persons carrying the respective portable terminals 41 to 44 (hereinafter referred to as registration target persons) and date and time information.

Then, at a point in time that a recipe proposal request to be described later is generated, the schedule recognizing section 161 recognizes how many persons need to be provided with food, what time the food is to be provided, and the like from the schedule information of the respective registration target persons from the portable terminals 41 to 44, the schedule information being stored in the storage area M7, and passes a result of the recognition to the recipe proposing section 165 to be described later. Hence, information regarding the number of persons for whom the food needs to be prepared and a time taken to provide the food (time necessary to make the food) is passed from the schedule recognizing section 161 to the recipe proposing section 165.

The health state grasping section 162 grasps the health states of the respective registration target persons from biological information of the respective registration target persons which biological information is sent from the respective portable terminals 41 to 44. The information processing device 1 can be configured to grasp the health states of the respective registration target persons by including a biological information analyzing section. However, this complicates the configuration of the information processing device 1 and increases a processing load. Thus, in the present embodiment, an external health state grasping server device is used.

Specifically, in the present embodiment, the health state grasping section 162 stores the uniform resource locator (URL) of the server device 9A as the health state grasping server device, accesses the server device 9A through the wireless communication circuit 171 and the Internet 8 by using the URL, sends the biological information of the respective registration target persons of the portable terminals 41 to 44, the biological information being accumulated from a last time to a time preceding by a predetermined time, for example, and makes a request to obtain health state information to the server device 9A.

The server device 9A generates information regarding the health states of the respective registration target persons from the biological information of the respective registration target persons, and sends the generated information regarding the health states to the information processing device 1. A database on correspondence relation between biological information and health states is prepared in the server device 9A. The server device 9A generates the information regarding the health states of the respective registration target persons by referring to the database using the biological information.

The health state grasping section 162 receives the information regarding the health states of the respective registration target persons from the server device 9A, and stores the information in, for example, the storage area M8 of the information storage memory 16DM for each of the registration target persons.

At a point in time that a recipe proposal request is generated, the health state grasping section 162 also performs processing of requesting the information regarding the above-described health states from the server device 9A and obtaining the information. Incidentally, the processing of requesting the information regarding the above-described health states from the server device 9A and obtaining the information may be performed in appropriate timing before the point in time at which the recipe proposal request is generated. Then, the health state grasping section 162 passes the information regarding the health states of the respective registration target persons to the recipe proposing section 165 according to a request from the recipe proposing section 165.

The food material grasping section 163 grasps stock food materials that can be used for cooking from information regarding the stock food materials which information is sent from the food material stock managing device 60 through the short-range wireless communication circuit 181. The food material grasping section 163 in the present example also performs processing of determining from the contents of the grasped stock food materials whether food materials specified in advance as food materials that are to be ordered when the food materials are out of stock are out of stock, and ordering the food materials through the Internet 8 when the food materials are out of stock. Incidentally, in this case, the food materials include other materials used for cooking, such as seasonings and spices. The food material grasping section 163 passes information regarding the grasped stock food materials to the recipe proposing section 165 according to a request from the recipe proposing section 165.

The preference information accumulating section 164 obtains preference information of each registration target person from meal condition information sent from the meal condition detecting device 7, and in the present example, the preference information accumulating section 164 stores the preference information in the storage area M9 of the information storage memory 16DM in association with each registration target person.

Here, as will be described later, the meal condition information sent from the meal condition detecting device 7 includes information regarding movement of a tableware group such as chopsticks, knives, forks, spoons, and dishes filled with food during a meal of the registration target persons served with the food, photographing information obtained by photographing, for example, a scene on a table provided with the food by a camera from above the table, and the biological information of the registration target persons served with the food. This is because the biological information of the registration target persons during the meal also relates to preferences of the registration target persons. The photographing information of the camera includes an image of the food served and provided in containers and video image information regarding meal conditions including movement of the registration target persons during the meal.

The information processing device 1 can also be configured to grasp the preferences of the registration target persons by including a functional section that grasps the preference information of the registration target persons from information regarding the meal conditions. However, this complicates the configuration of the information processing device 1, and increases a processing load. Thus, in the present embodiment, an external preference information grasping server device is used.

Specifically, in the present embodiment, the preference information accumulating section 164 stores the URL of the server device 9B as the preference information grasping server device, accesses the server device 9B through the wireless communication circuit 171 and the Internet 8 by using the URL, sends the meal condition information from the meal condition detecting device 7 to the server device 9B, and makes a request to obtain the preference information.

The server device 9B generates the preference information of the registration target persons from the meal condition information, and sends the generated preference information to the information processing device 1. The server device 9B analyzes movement information of each registration target person during the meal from movement of tableware which movement is included in the meal condition information, and analyzes provided dishes and movement and response of each registration target person with regard to each dish from the photographed image information of the camera. A database on correspondence relation of information regarding a result of the analysis and the biological information of each registration target person to the preference information is prepared in the server device 9B. The server device 9B generates the preference information of each registration target person by using the database, and transmits the preference information to the information processing device 1.

The preference information accumulating section 164 obtains the preference information of each registration target person which preference information is sent from the server device 9B, and in the present example, the preference information accumulating section 164 stores the preference information in the storage area M9 of the information storage memory 16DM in association with each registration target person. The preference information accumulating section 164 passes the accumulated preference information of each registration target person to the recipe proposing section 165 according to a request from the recipe proposing section 165.

The recipe proposing section 165 in the present example determines that a recipe proposal request is generated when a recipe request button (not depicted) displayed in the residual display area of the display screen of the information processing device 1 is indicated by the marker-equipped position indicator 2. Incidentally, in a case where the times of a breakfast, a lunch, and a dinner are determined in advance, the recipe proposing section 165 may automatically generate the recipe proposal request a predetermined time before each of the meal times, for example, one hour before each of the meal times. In addition, the recipe proposing section 165 may obtain the schedule information from the schedule recognizing section 161 in advance, determine the meal times of a breakfast, a lunch, and a dinner from the schedule information, and automatically generate the recipe proposal request a predetermined time before each of the meal times, for example, one hour before each of the meal times.

When the recipe proposal request is generated, the recipe proposing section 165 makes an information obtainment request to each of the schedule recognizing section 161, the health state grasping section 162, the food material grasping section 163, and the preference information accumulating section 164, and obtains the schedule information, the health state information, and the preference information of each registration target person, and information regarding the stock food materials.

Then, from the obtained information, the recipe proposing section 165 proposes recipe information for a plurality of dishes in the present example.

The information processing device 1 can be configured to include a functional section that proposes recipes for the dishes from the schedule information, the health state information, and the preference information of each registration target person, and the information regarding the stock food materials. However, this complicates the configuration of the information processing device 1, and increases a processing load. Thus, in the present embodiment, an external recipe proposing server device is used.

Specifically, in the present embodiment, the recipe proposing section 165 stores the URL of the server device 9C as the recipe proposing server device, accesses the server device 9C through the wireless communication circuit 171 and the Internet 8 by using the URL, sends the health state information and the preference information of the registration target persons to be served with food, the information regarding the stock food materials, and a meal provision time to the server device 9C, and makes a request to obtain the recipe information. Here, in the present example, the recipe proposing section 165 identifies the registration target persons to be served with food and determines the meal provision time from the schedule information. However, the schedule information, the health state information, and the preference information of all of the registration target persons and the information regarding the stock food materials may be sent to the server device 9C, and the server device 9C may identify the registration target persons to be served with food and determine the meal provision time.

The server device 9C generates recipe information for a plurality of dishes from the information received from the information processing device 1, and sends the generated recipe information for the dishes to the information processing device 1. The server device 9C in the present example includes a database that stores information such as the health state information and the preference information of the registration target persons to be served with food, the information regarding the stock food materials, and the meal provision time and the recipe information for the dishes in association with each other. The server device 9C selects and generates a plurality of pieces of recipe information to be proposed by using the database, and transmits the plurality of pieces of recipe information to the information processing device 1.

The recipe proposing section 165 obtains the plurality of pieces of recipe information sent from the server device 9C, and in the present example, the recipe proposing section 165 presents the plurality of pieces of recipe information to the user of the information processing device 1 by displaying the plurality of pieces of recipe information in the residual display area ARw of the display screen 11D.

Example of Configuration of Portable Terminals 41 to 44

The portable terminals 41 to 44 in the present example are constituted by an advanced mobile telephone terminal referred to as an ordinary smart phone. However, as described earlier, an application program that performs communication as described above with the information processing device 1 is installed on each of the portable terminals 41 to 44 in advance.

Figure 6:
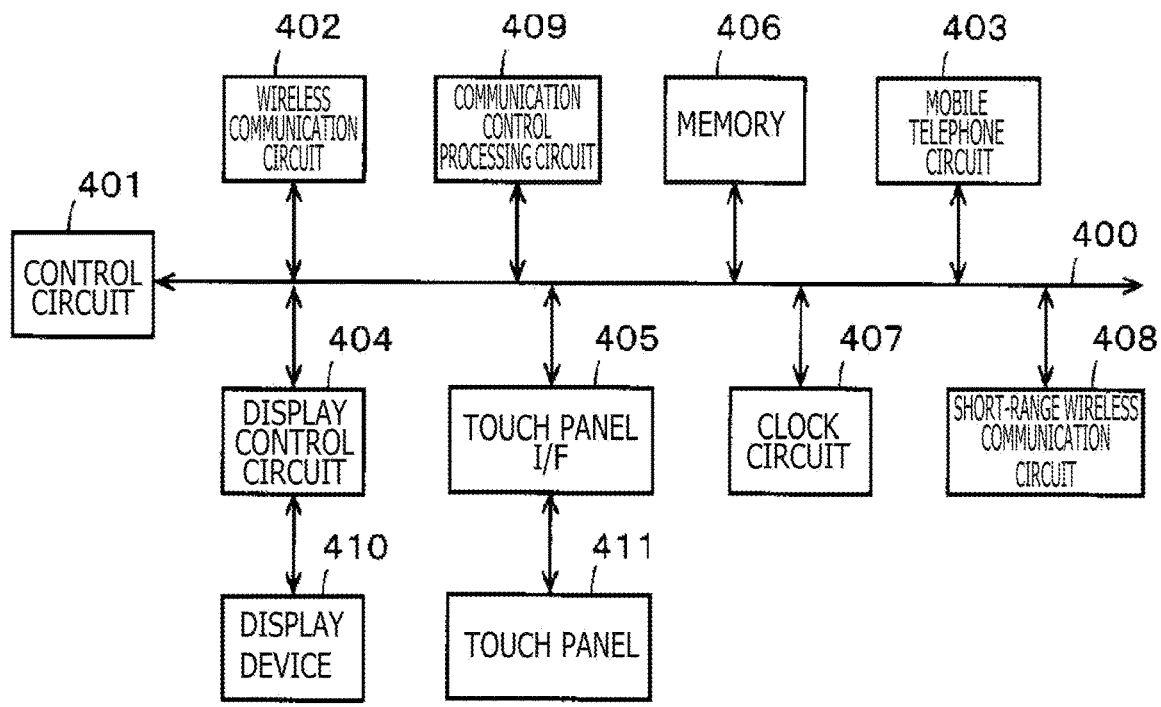
FIG. 6 is a block diagram depicting an example of a configuration of a portable terminal that performs communication with the information processing device constituting the information processing system according to the embodiment of FIG. 1.

The portable terminals 41 to 44 have a substantially identical hardware configuration, and have a configuration as depicted in FIG. 6. Incidentally, in the following description, an example of a configuration of the portable terminal 41 will be described for the convenience of description.

As depicted in FIG. 6, the portable terminal 41 is configured by connecting each of a wireless communication circuit 402, a mobile telephone circuit 403, a display control circuit 404, a touch panel interface 405, a memory 406, a clock circuit 407, a short-range wireless communication circuit 408, and a communication control processing circuit 409 to a control circuit 401 constituted by a computer through a system bus 400. A display device 410 formed by a liquid crystal display (LCD), for example, is connected to the display control circuit 404. A touch panel 411 is connected to the touch panel interface 405. The touch panel 411 is provided under a display screen of the display device 410.

The wireless communication circuit 402 performs wireless communication with another communication terminal such as the information processing device 1. The mobile telephone circuit 403 enables telephone communication similar to that of an ordinary mobile telephone. The memory 406 stores information input through the touch panel 411 and the like, and stores received information. The clock circuit 407 provides information regarding a date and time. The short-range wireless communication circuit 408 in the present example performs wireless communication of the Bluetooth (registered trademark) standard, and establishes a wireless connection and communicating with the wearable terminal 51 (wearable terminals 52 to 54 in the cases of the portable terminals 42 to 44) worn by the registration target carrying the portable terminal 41.

The communication control processing circuit 409 in the present example represents, as a functional block, a part executed by the application program that performs wireless communication as described above with the information processing device 1. The communication control processing circuit 409 stores the electronic mail address of the information processing device 1 as an electronic mail destination address. The communication control processing circuit 409 performs processing control for communication with the information processing device 1 described above.

The communication control processing circuit 409 performs processing for transmission of an electronic mail addressed to the information processing device 1 by the user, and performs processing of making a display request for display information displayed on the display screen 11D to the information processing device 1 and processing of receiving information sent from the information processing device 1.

Example of Configuration of Wearable Terminals 51 to 54

Figure 7:
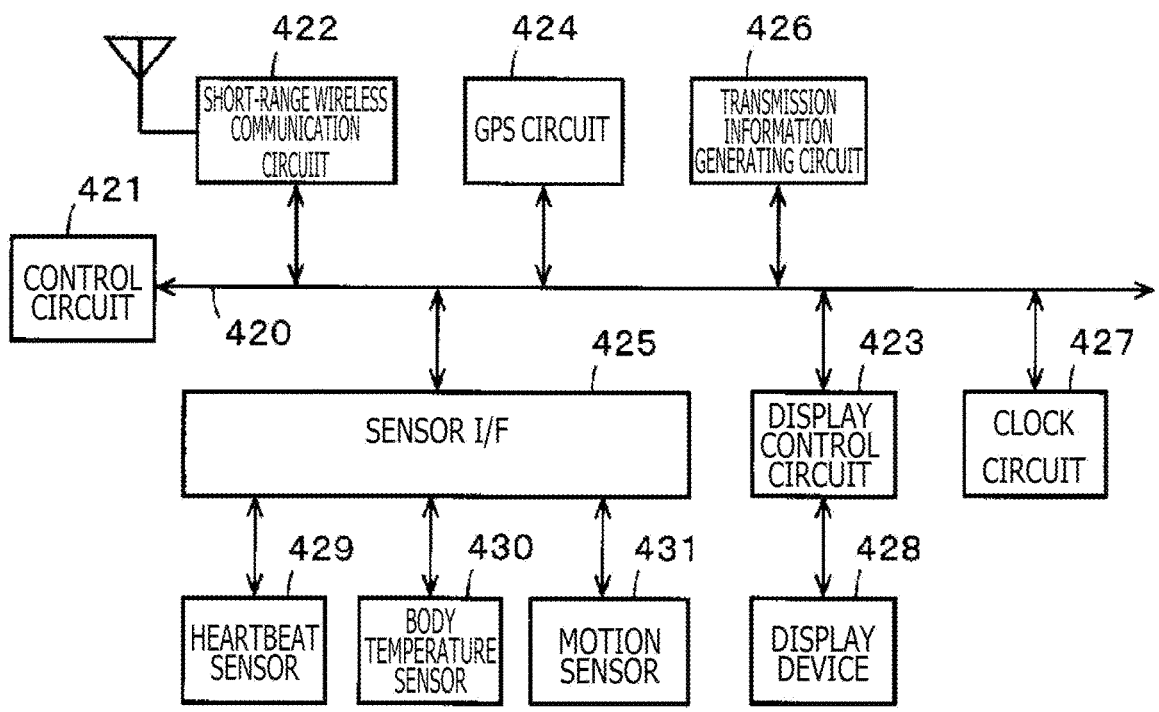
FIG. 7 is a block diagram depicting an example of a configuration of a wearable terminal made to communicate with a portable terminal that performs communication with the information processing device constituting the information processing system according to the embodiment of FIG. 1.

The wearable terminals 51 to 54 in the present example have a configuration of a type worn as a wristwatch (smart watch) by a person. The wearable terminals 51 to 54 have a similar configuration, and have a configuration as depicted in FIG. 7. Incidentally, in the following description, the wearable terminal 51 will be described for the convenience of description.

As depicted in FIG. 7, the wearable terminal 51 is configured by connecting each of a short-range wireless communication circuit 422, a display control circuit 423, a global positioning system (GPS) functional circuit 424, a sensor interface 425, a transmission information generating circuit 426, and a clock circuit 427 to a control circuit 421 constituted by a computer through a system bus 420. A display device 428 formed by an LCD, for example, is connected to the display control circuit 423.

The short-range wireless communication circuit 422 performs wireless communication with the short-range wireless communication circuit 408 of the portable terminal 41. The GPS functional circuit 424 detects the present position of the registration target person wearing the wearable terminal 41.

The sensor interface 425 in the present example is connected with a heartbeat sensor 429, a body temperature sensor 430, and a motion sensor 431. The heartbeat sensor 429, the body temperature sensor 430, and the motion sensor 431 detect the heartbeat, body temperature, and bodily movement of the registration target person wearing the wearable terminal 51. Incidentally, the sensor interface 425 may, of course, be connected with a sensor for obtaining other biological information as necessary.

The transmission information generating circuit 426 generates transmission information for the registration target person wearing the wearable terminal 51 from biological information from the heartbeat sensor 429, the body temperature sensor 430, and the motion sensor 431, which biological information is obtained through the sensor interface 425, position information from the GPS functional circuit 424, and information regarding the date and time that the biological information is obtained from the clock circuit 427.

The control circuit 421 transmits the transmission information generated by the transmission information generating circuit 426 to the portable terminal 41 according to a request to obtain the biological information from the portable terminal 41.

Example of Configuration of Food Material Stock Managing Device 60

Figure 8:
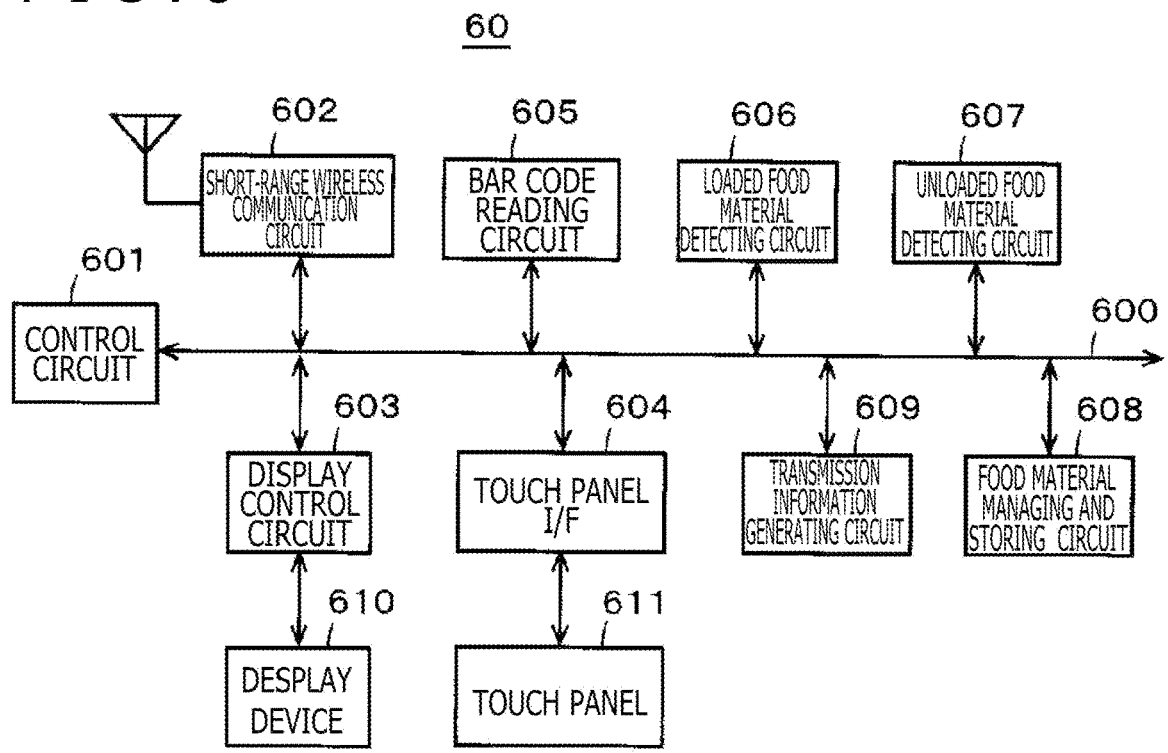
FIG. 8 is a block diagram depicting an example of a configuration of a food material stock managing device that performs communication with the information processing device constituting the information processing system according to the embodiment of FIG. 1.

FIG. 8 is a block diagram depicting an example of a configuration of the food material stock managing device 60 provided to the refrigerator 6. As depicted in FIG. 8, the food material stock managing device 60 is configured by connecting each of a short-range wireless communication circuit 602, a display control circuit 603, a touch panel interface 604, a bar code reading circuit 605, a loaded food material detecting circuit 606, an unloaded food material detecting circuit 607, a food material managing and storing circuit 608, and a transmission information generating circuit 609 to a control circuit 601 constituted by a computer through a system bus 600. In one or more embodiments, the control circuit 601 incudes a processor and a memory storing instructions that, when executed by the processor, cause the control circuit 601 to perform the functions described herein. For example, the control circuit 601 includes a CPU. A display device 610 formed by an LCD, for example, is connected to the display control circuit 603. A touch panel 611 is connected to the touch panel interface 604. The touch panel 611 is provided on the back side of a display screen 610D (see FIG. 1) of the display device 610 so as to be superposed on the display screen 610D.

The short-range wireless communication circuit 602 performs wireless communication with the short-range wireless communication circuit 181 of the information processing device 1. The bar code reading circuit 605 reads a bar code attached to a food material when the food material is loaded into or unloaded from the refrigerator 6. In the present example, the display screen of the display device 610 displays a loading button and an unloading button as icon buttons. The user of the refrigerator 6 operates the loading button at a time of loading a food material, and operates the unloading button at a time of unloading a food material.

When the loading button is pressed, the loaded food material detecting circuit 606 detects the loaded food material on the basis of the bar code sent from the bar code reading circuit 605, and sends food material information (for example information regarding the name of the food material) as a result of the detection to the food material managing and storing circuit 608. In addition, when the unloading button is pressed, the unloaded food material detecting circuit 607 detects the unloaded food material on the basis of the bar code sent from the bar code reading circuit 605, and sends food material information as a result of the detection to the food material managing and storing circuit 608.

When the food material managing and storing circuit 608 receives the food material information as the detection result from the loaded food material detecting circuit 606, the food material managing and storing circuit 608 stores the food material information, and when the food material managing and storing circuit 608 receives the food material information as the detection result from the unloaded food material detecting circuit 607, the food material managing and storing circuit 608 deletes the food material information from memory. The food material managing and storing circuit 608 thereby stores food materials (stock food materials) stored in the refrigerator 6.

Incidentally, a list of the stock food materials stored in the food material managing and storing circuit 608 may be displayed on the display screen of the display device 610, and at the time of unloading, the user may indicate the unloaded food material from the list of the stock food materials through the touch panel 611. In that case, when the unloaded food material detecting circuit 607 detects the indication of the unloaded food material through the touch panel 611, the unloaded food material detecting circuit 607 supplies a result of the detection to the food material managing and storing circuit 608. Thus, the food material managing and storing circuit 608 deletes the food material indicated through the touch panel 611 from the stock food materials.

In addition, in a case of loading a food material to which bar code is not attached, the user can input the name of the food material through the touch panel 611. The loaded food material detecting circuit 606 passes the input name of the food material as a result of detection of the loaded food material to the food material managing and storing circuit 608. Thus, the food material managing and storing circuit 608 also stores the food material input through the touch panel 611.

When the transmission information generating circuit 609 receives a request to obtain information regarding the stock food materials from the information processing device 1 through the short-range wireless communication circuit 602, the transmission information generating circuit 609 reads the information regarding the stock food materials stored in the food material managing and storing circuit 608, and transmits the information to the information processing device 1 through the short-range wireless communication circuit 602.

Example of Configuration of Meal Condition Detecting Device 7

As depicted in FIG. 1, the meal condition detecting device 7 includes: a position detecting sensor 7S provided on the top surface of a table 7T on which dishes are placed; a camera 7CM disposed so as to photograph the top surface of the table 7T from above; and a tableware group 7DS including interaction circuits that interact with the position detecting sensor 7S. In addition, the wearable terminals 51 to 54 worn by the registration target persons are a part of constituent elements of the meal condition detecting device 7. The camera 7CM is attached to a position at which the camera 7CM can photograph the entire top surface of the table 7T and registration target persons sitting at the table 7T, for example, to a ceiling above the table 7T. The camera 7CM has a function of performing wireless communication with a communicating circuit provided to the meal condition detecting device 7.

As with the position detecting sensor 13 of the information processing device 1 described above, the position detecting sensor 7S in the present example is of the electromagnetic induction type. The tableware group 7DS in the example of FIG. 1 includes chopsticks 71, a fork 72, a spoon 73, and a dish 74, which are respectively equipped with resonance circuits 71RC, 72RC, 73RC, and 74RC including a coil and a capacitor as an interaction circuit for electromagnetic induction coupling with the position detecting sensor 7S.

Figure 9:
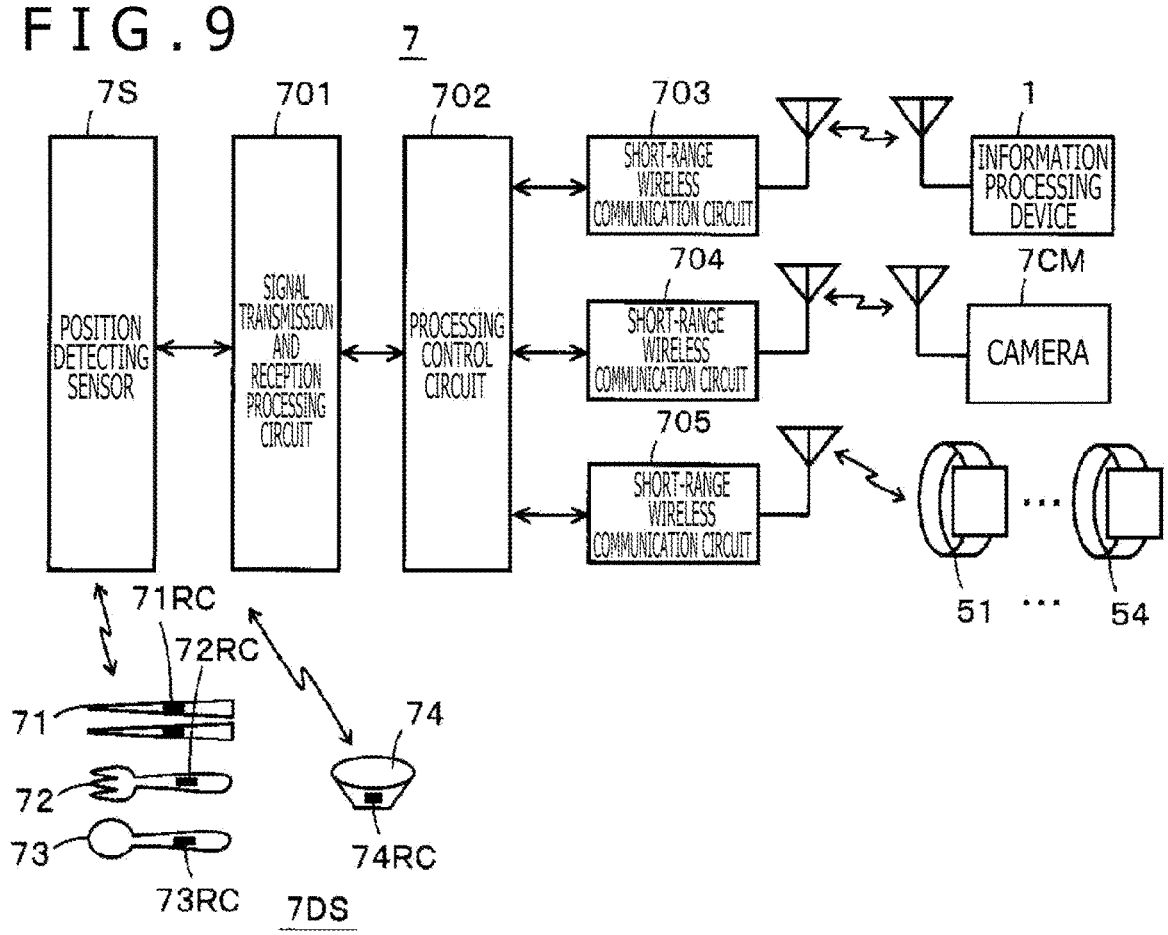
FIG. 9 is a block diagram depicting an example of a configuration of a meal condition detecting device that performs communication with the information processing device constituting the information processing system according to the embodiment of FIG. 1.

FIG. 9 depicts an example of a configuration of the meal condition detecting device 7. Though not depicted, the position detecting sensor 7S has a configuration similar to that depicted in FIG. 1. The position detecting sensor 7S is connected to a signal transmission and reception processing circuit 701 to constitute a position detecting circuit. The signal transmission and reception processing circuit 701 is connected to a processing control circuit 702.

As in the description with reference to FIG. 1, the signal transmission and reception processing circuit 701 transmits a signal of a predetermined frequency through the position detecting sensor 7S, and receives signals fed back from the resonance circuits 71RC to 74RC of the respective pieces of tableware 71 to 74 of the tableware group 7DS. The signal transmission and reception processing circuit 701 thereby detects the position of each piece of tableware 71 to 74 of the tableware group 7DS on the position detecting sensor 7S, that is, the position thereof on the top surface of the table 7T. The signal transmission and reception processing circuit 701 thus detects movement of each piece of tableware 71 to 74 of the tableware group 7DS. In this case, the resonance frequencies of the resonance circuits 71RC to 74RC of the respective pieces of tableware 71 to 74 of the tableware group 7DS are configured to be different from each other. Therefore, the signal transmission and reception processing circuit 701 can detect the position of each piece of tableware 71 to 74 individually.

In this case, when the registration target persons sit at the table 7T at a time of a meal, each of the registration target persons is at a same sitting position with respect to the table 7T, and positions on the table 7T of the tableware group 7DS for each registration target person and ranges of movement thereof are determined for each registration target person. For example, the father sits at the position of the head of the table 7T, the mother sits on a side of the father, and the elder sister and Taro sit on a side facing the father.

Accordingly, in the present embodiment, though not depicted, the detection area of the position detecting sensor 7S can be divided into areas of predetermined ranges corresponding to the sitting positions of the respective registration target persons. Hence, even in a case where it is assumed that each registration target person uses the same tableware group 7DS, the positions of the tableware group 7DS in the areas of the respective predetermined ranges and movements thereof can be detected as positions and movements corresponding to behavior of the corresponding registration target persons during the meal. The preferences of each registration target person can be determined by referring to the photographing information of the camera 7CM together with the movements of the tableware group 7DS.

That is, a person often exhibits behavior according to likes and dislikes during a meal, and the movements of tableware such as chopsticks, a fork, a spoon, and a dish are according to the behavior. For example, a person exhibits a behavior of eating food that the person likes while frequently moving the chopsticks, the fork, and the spoon. On the other hand, the person does not touch or reluctantly touches a thing that the person dislikes, and therefore, the person exhibits a behavior of eating while moving the chopsticks, the fork, and the spoon slowly. Hence, the preferences of each registration target person can be determined by referring to the photographing information of the camera 7CM and the biological information from the wearable terminals 51 to 54 in the present example together with the movements of the tableware group 7DS.

Thus, the signal transmission and reception processing circuit 701 detects the behavior during the meal of each registration target person as information regarding the positions and movements of each tableware group 7DS. Then, the signal transmission and reception processing circuit 701 supplies the processing control circuit 702 with the information regarding the positions and movements of each tableware group 7DS according to the detected behavior during the meal of each registration target person in association with the identification information of each registration target person.

The processing control circuit 702 is configured to include a computer. In the present example, the processing control circuit 702 is connected with a short-range wireless communication circuit 703 that performs wireless communication with the short-range wireless communication circuit 181 of the information processing device 1, a short-range wireless communication circuit 704 that performs wireless communication with a wireless communication circuit of the camera 7CM, and a short-range wireless communication circuit 705 that performs wireless communication with the wearable terminals 51 to 54 worn by the registration target persons. The short-range wireless communication circuits 703, 704, and 705 in the present example are constituted by a short-range wireless communication circuit that performs wireless communication of the Bluetooth (registered trademark) standard.

In addition, the processing control circuit 702 obtains the photographing information (e.g., image data) during the meal from the camera 7CM through the short-range wireless communication circuit 704. Further, the processing control circuit 702 obtains the biological information during the meal of each registration target person through the short-range wireless communication circuit 705. The pieces of biological information of the respective registration target persons are each obtained individually by making a request to obtain the biological information to the wearable terminals 51 to 54 of the respective registration target persons on a time-division basis.

Then, the processing control circuit 702 transmits, as meal condition information, information regarding the positions and movements of each tableware group 7DS according to the behavior during the meal of each registration target person and the biological information of each registration target person, the information regarding the positions and movements of each tableware group 7DS and the biological information of each registration target person being obtained during the meal as described above, to the information processing device 1 through the short-range wireless communication circuit 703 in association with the identification information of each registration target person together with the photographing information of the camera 7CM.

Description of Example of Flow of Processing of Information Processing Device 1

FIGS. 10 to 14 are diagrams of assistance in explaining an example of a flow of processing operation performed by the processing control circuit 16 in the information processing device 1 according to the present embodiment.

The processing control circuit 16 detects whether or not writing input based on position indication input to the position detecting sensor 13 by the marker-equipped position indicator 2 is sensed (S101). When the processing control circuit 16 determines at S101 that writing input is sensed, the processing control circuit 16 detects an area in which the writing input is sensed within the detection area of the position detecting sensor 13 (S102).

Then, the processing control circuit 16 determines whether the detected area is a partial input area corresponding to the partial display area AR5 for which the "common use" is set (common area) by referring to the table information TBL depicted in FIG. 5 (S103). When the processing control circuit 16 determines that the detected area is the partial input area corresponding to the partial display area AR5 for which the "common use" is set, the processing control circuit 16 stores the writing data based on the detected writing input in the storage area M5 corresponding to the partial display area AR5 in the information storage memory 16DM together with information regarding whether or not erasure is possible according to the resonance frequency of the detected writing input (S104).

Next, the processing control circuit 16 determines whether or not erasure input by the eraser functional member 3 is detected (S105). When the processing control circuit 16 determines that erasure input is detected, the processing control circuit 16 deletes the writing data corresponding to a part indicated by the erasure input (S106). Here, because the pen writing input is before being ended, the writing data corresponding to the part indicated by the erasure input is erased irrespective of the information regarding whether or not erasure of the writing data is possible. Incidentally, when an operation of erasing the ink writing is performed by the eraser functional member 3 at a point in time after the end of the writing input, whether or not to erase also the writing data is determined on the basis of the information regarding whether or not erasure of the writing data is possible.

When the processing control circuit 16 determines that erasure input is not detected at S105, and after the processing control circuit 16 deletes the writing data corresponding to the part indicated by the erasure input at S106, the processing control circuit 16 determines whether or not the writing input by the marker-equipped position indicator 2 is ended (S107). When the processing control circuit 16 determines that the writing input is not ended, the processing control circuit 16 returns the processing to S104. Here, whether or not the writing input is ended at S107 may be determined by an explicit instruction input for the writing input by the user of the marker-equipped position indicator 2, or it may be determined that the writing input is ended when the writing input is not detected for a predetermined time or more in the area detected at S102.

When the processing control circuit 16 determines at S107 that the writing input by the marker-equipped position indicator 2 is ended, the processing control circuit 16 determines whether or not an "entire area mode" is set (S108). When the processing control circuit 16 determines at S108 that the "entire area mode" is not set, the processing control circuit 16 transmits the display data of the writing data for the partial input area corresponding to the partial display area AR5 for the common use, in which area the writing input is detected, to all of the portable terminals set in correspondence with the partial display area AR5, for example, the portable terminals 41 to 44 (S109). Then, the processing control circuit 16 returns the processing to S101.

In addition, when the processing control circuit 16 determines at in S108 that the "entire area mode" is set, the processing control circuit 16 transmits not only the display data of the writing data for the partial input area corresponding to the partial display area AR5 for the common use, in which area the writing input is detected, but also display data displayed in the display area of the display screen 11D to all of the portable terminals set in correspondence with the partial display area AR5 for the common use, for example, the portable terminals 41 to 44 (S110). Then, the processing control circuit 16 returns the processing to S101.

Figure 11:
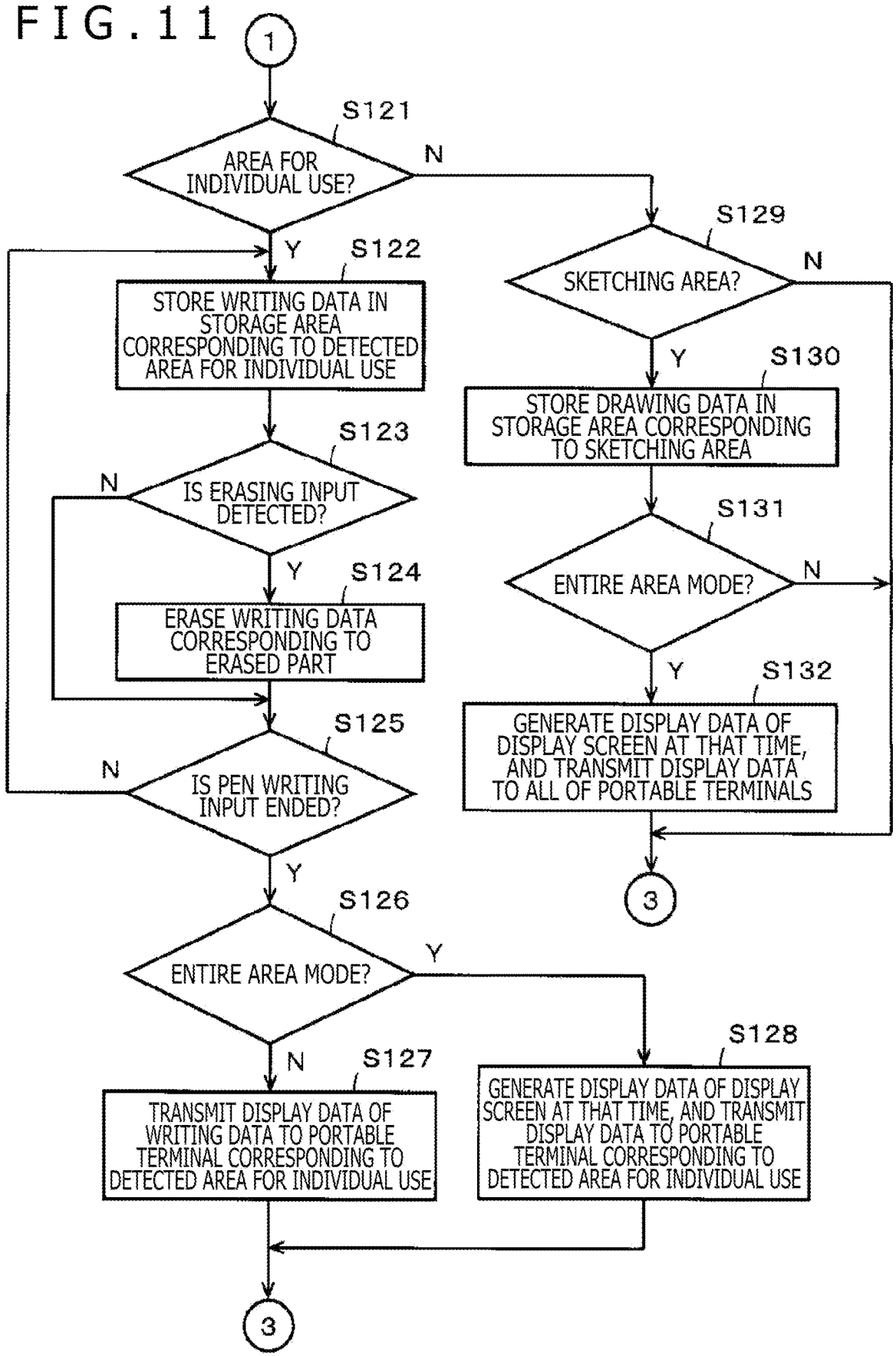
FIG. 11 is a diagram depicting a part of the flowchart of assistance in explaining the example of the flow of the processing of the information processing device constituting the information processing system according to the embodiment of FIG. 1.

In addition, when the processing control circuit 16 determines at S103 that the area in which the writing input is detected is not the partial input area corresponding to the partial display area AR5 for which the "common use" is set, the processing control circuit 16 refers to the table information TBL depicted in FIG. 5, and determines whether or not the writing input is detected in a partial input area (area for individual use) corresponding to any one of the partial display areas AR1 to AR4 for individual use (S121 in FIG. 11). Incidentally, at S121, the partial display areas for individual use may include partial display areas AR6 and AR7 for watching use.

When the processing control circuit 16 determines at S121 that the area in which the writing input is detected is a partial input area corresponding to any one of the partial display areas AR1 to AR4 for individual use, the processing control circuit 16 stores the detected writing data in a storage area corresponding to the sensed partial input area in the information storage memory 16DM together with the information regarding whether or not erasure is possible according to the resonance frequency of the detected writing input (S122). Then, the processing control circuit 16 determines whether or not erasure input by the eraser functional member 3 is detected (S123). When the processing control circuit 16 determines that the erasure input is detected, the processing control circuit 16 erases the writing data corresponding to a part indicated by the erasure input (S124). Here, because the pen writing input is before being ended, the writing data corresponding to the part indicated by the erasure input is erased irrespective of the information regarding whether or not erasure of the writing data is possible.

When the processing control circuit 16 determines that erasure input is not detected at S123, and after the processing control circuit 16 erases the writing data corresponding to the part indicated by the erasure input at S124, the processing control circuit 16 determines whether or not the writing input by the marker-equipped position indicator 2 is ended (S125). When the processing control circuit 16 determines that the writing input is not ended, the processing control circuit 16 returns the processing to S122.

When the processing control circuit 16 determines at S125 that the writing input by the marker-equipped position indicator 2 is ended, the processing control circuit 16 determines whether or not the "entire area mode" is set (S126). When the processing control circuit 16 determines at S126 that the "entire area mode" is not set, the processing control circuit 16 transmits the display data of the writing data for the partial input area corresponding to the partial display area for individual use, in which area the writing input is detected, to a portable terminal set in correspondence with the partial display area for individual use (S127). Then, the processing control circuit 16 returns the processing to S101 in FIG. 10.

In addition, when the processing control circuit 16 determines at S126 that the "entire area mode" is set, the processing control circuit 16 transmits not only the display data of the writing data for the partial input area corresponding to the partial display area for individual use, in which area the writing input is detected, but also display data displayed in the display area of the display screen 11D to the portable terminal set in correspondence with the partial display area for individual use (S128). Then, the processing control circuit 16 returns the processing to S101 in FIG. 10.

Figure 10:
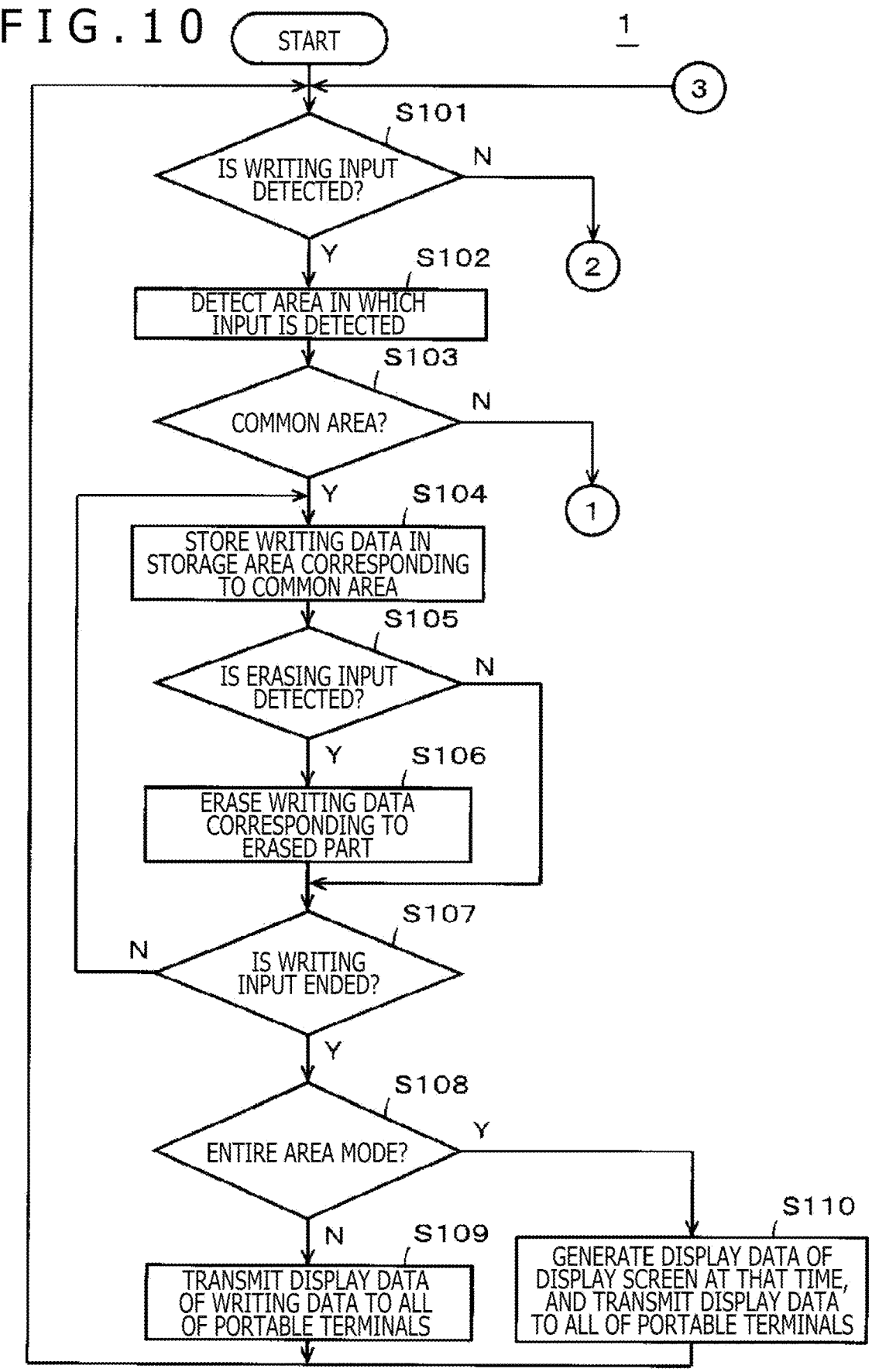
FIG. 10 is a diagram depicting a part of a flowchart of assistance in explaining an example of a flow of processing of the information processing device constituting the information processing system according to the embodiment of FIG. 1.
Figure 12:
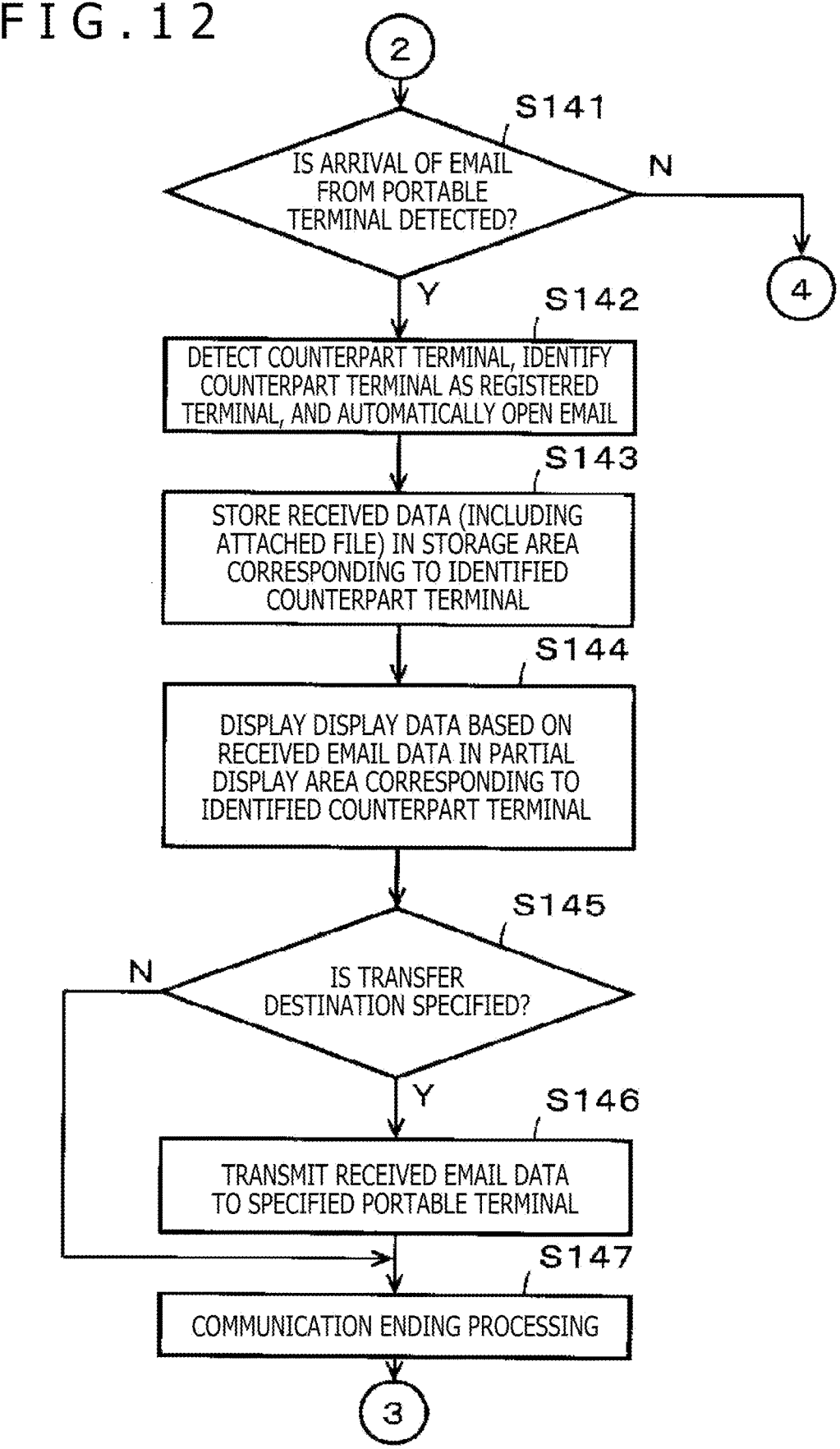
FIG. 12 is a diagram depicting a part of the flowchart of assistance in explaining the example of the flow of the processing of the information processing device constituting the information processing system according to the embodiment of FIG. 1.

Next, when the processing control circuit 16 determines at S101 in FIG. 10 that writing input is not detected, the processing control circuit 16 determines whether or not arrival of an electronic mail is detected (S141 in FIG. 12). When the processing control circuit 16 determines at S141 that arrival of an electronic mail is detected, the processing control circuit 16 refers to the table information TBL depicted in FIG. 5 on the basis of the electronic mail address information of a transmission source, identifies any one of the registered portable terminals 41 to 44, 45K, and 56K as the transmission source of the received mail, and automatically opens the electronic mail when the identification is made (S142).

Then, the processing control circuit 16 stores the received data in the storage area corresponding to the partial display area corresponding to the counterpart portable terminal identified at S142 in the information storage memory 16DM (S143).

Next, the processing control circuit 16 makes display according to display data based on the received data in the partial display area corresponding to the counterpart portable terminal identified at S142 (S144).

Next, the processing control circuit 16 determines whether or not a transfer destination is specified in the received electronic mail (S145). When the processing control circuit 16 determines that transfer destination is not specified, the processing control circuit 16 performs communication ending processing (S147), and thereafter returns the processing to S101 in FIG. 10. In addition, when the processing control circuit 16 determines that a transfer destination is specified, the processing control circuit 16 transmits the received data to the specified portable terminal among the portable terminals set in correspondence with the partial display areas AR1 to AR5 (S146). Here, when "common" is specified as a transfer destination, it means that the plurality of portable terminals corresponding to the partial display area AR5 are specified as transfer destinations, and the processing control circuit 16 transmits the received data to the other portable terminals than the portable terminal that has sent the received data. Then, the processing control circuit 16 performs communication ending processing (S147), and thereafter returns the processing to S101 in FIG. 10.

Figure 13:
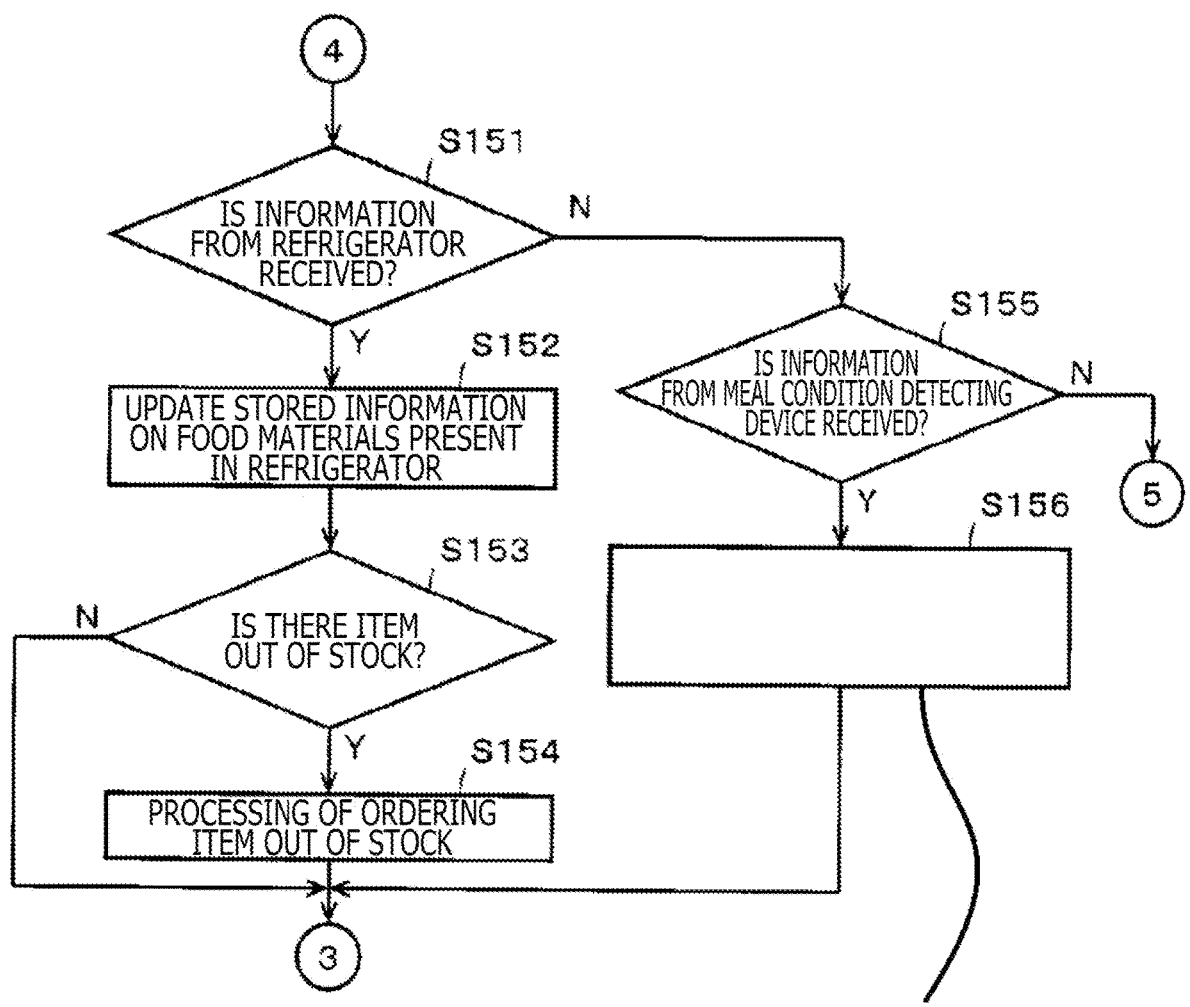
FIG. 13 is a diagram depicting a part of the flowchart of assistance in explaining the example of the flow of the processing of the information processing device constituting the information processing system according to the embodiment of FIG. 1.

When the processing control circuit 16 determines at S141 that arrival of a mail from a portable terminal is not detected, the processing control circuit 16 determines whether or not information regarding the stock food materials from the food material stock managing device 60 of the refrigerator 6 is received (S151 in FIG. 13). When the processing control circuit 16 determines at S151 that the information regarding the stock food materials from the food material stock managing device 60 is received, the processing control circuit 16 updates stored information regarding the stock food materials in the refrigerator 6 by using the received information (S152).

Then, the processing control circuit 16 determines whether or not there is an item out of stock among food materials specified as essential in advance with regard to the updated information regarding the stock food materials (S153). When the processing control circuit 16 determines at S153 that there is no item out of stock, the processing control circuit 16 returns the processing to S101 in FIG. 10. In addition, when the processing control circuit 16 determines at S153 that there is an item out of stock, the processing control circuit 16 orders the food material as the item out of stock through the Internet 8 (S154). Thereafter, the processing control circuit 16 returns the processing to S101 in FIG. 10.

In addition, when the processing control circuit 16 determines at S151 that the information regarding the stock food materials from the food material stock managing device 60 is not received, the processing control circuit 16 determines whether or not meal condition information from the meal condition detecting device 7 is received (S155). When the processing control circuit 16 determines at S155 that the meal condition information from the meal condition detecting device 7 is received, the processing control circuit 16 divides the received meal condition information from the meal condition detecting device 7 into the photographing information of the camera 7CM and information regarding the meal conditions of each registration target person (including biological information), and stores and accumulates the photographing information of the camera 7CM and the information regarding the meal conditions of each registration target person in association with obtained date and time information (S156). Thereafter, the processing control circuit 16 returns the processing to S101 in FIG. 10.

Figure 14:
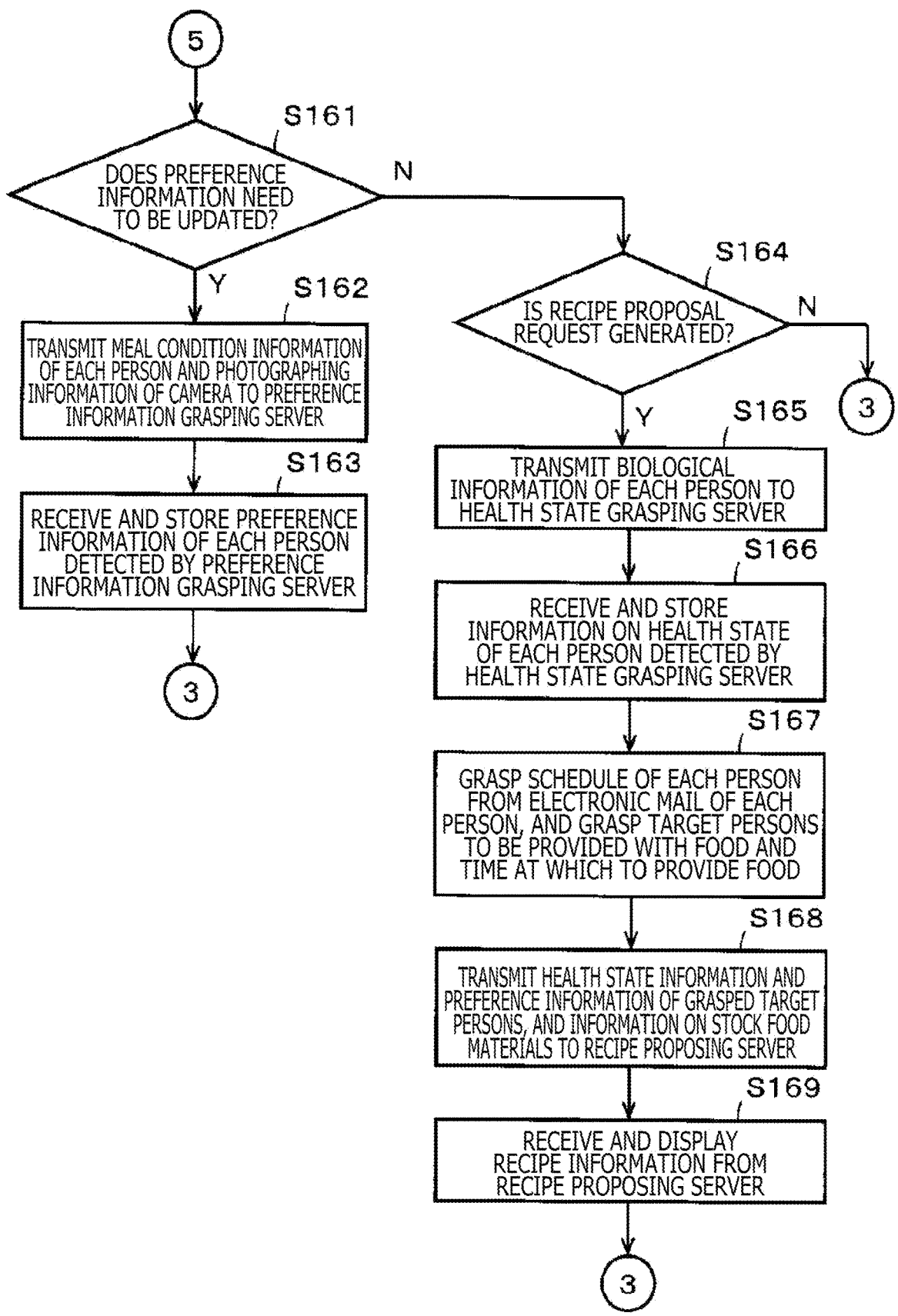
FIG. 14 is a diagram depicting a part of the flowchart of assistance in explaining the example of the flow of the processing of the information processing device constituting the information processing system according to the embodiment of FIG. 1.

In addition, when the processing control circuit 16 determines at S155 that the meal condition information from the meal condition detecting device 7 is not received, the processing control circuit 16 determines whether or not the preference information of registration target persons needs to be updated (S161 in FIG. 14). In the present example, the determination processing at S161 is made according to whether or not new meal condition information is received from the meal condition detecting device 7.

When the processing control circuit 16 determines at S161 that the preference information of registration target persons needs to be updated, the processing control circuit 16 transmits information regarding the meal conditions of each registration target person (including biological information) and the photographing information of the camera 7CM to the server device 9B as the preference information grasping server device through the wireless communication circuit 171 and the Internet 8, and makes a request to obtain the preference information (S162).

In response to the request to obtain the preference information, the preference information of each registration target person is sent from the server device 9B. Thus, the processing control circuit 16 receives the preference information of each registration target person, and stores the preference information in the storage area M9 of the information storage memory 16DM (S163). Thereafter, the processing control circuit 16 returns the processing to S101.

When the processing control circuit 16 determines at S161 that the preference information of registration target persons does not need to be updated, the processing control circuit 16 determines whether or not a recipe proposal request is generated (S164). When the processing control circuit 16 determines that recipe proposal request is not generated, the processing control circuit 16 returns the processing to S101 in FIG. 10.

Then, when the processing control circuit 16 determines at S164 that a recipe proposal request is generated, the processing control circuit 16 sends the biological information of each registration target person which biological information is stored in the storage area M8 of the information storage memory 16DM to the server device 9A as the health state grasping server device, and makes a request to obtain health state information (S165).

In response to the request to obtain the health state information, information regarding the health state of each registration target person is sent from the server device 9A. Thus, the processing control circuit 16 receives the information regarding the health state of each registration target person, and stores the information in the storage area M8 of the information storage memory 16DM (S166).

Next, the processing control circuit 16 grasps registration target persons who need to be provided with food, a time at which to provide the food, and the like from the schedule information of each registration target person from the portable terminals 41 to 44, the schedule information being stored in the storage area M7 (S167). Then, the processing control circuit 16 transmits the health state information and the preference information of the grasped registration target persons, the grasped time at which to make the provision, and the information regarding the stock food materials to the server device 9C as the recipe proposing server (S168).

Then, the processing control circuit 16 receives a plurality of pieces of recipe information sent from the server device 9C, and displays the plurality of pieces of recipe information as proposed recipes in the residual display area ARw of the display screen 11D (S169). Thereafter, the processing control circuit 16 returns the processing to S101 in FIG. 10.

Example of Flow of Processing of Portable Terminals 41 to 44

Figure 15:
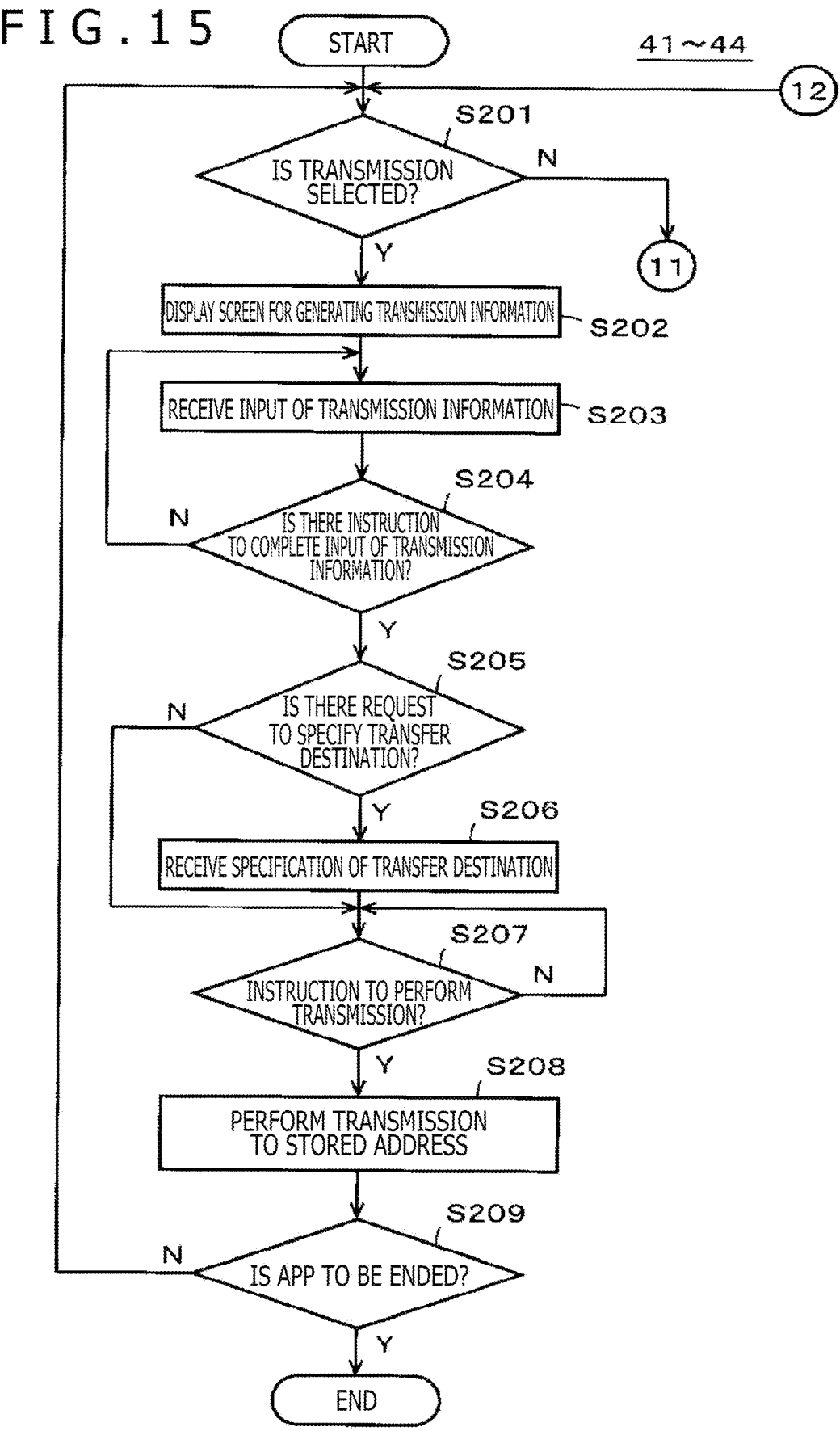
FIG. 15 is a diagram depicting a part of a flowchart of assistance in explaining an example of a flow of processing of a portable terminal that performs communication with the information processing device constituting the information processing system according to the embodiment of FIG. 1.
Figure 16:
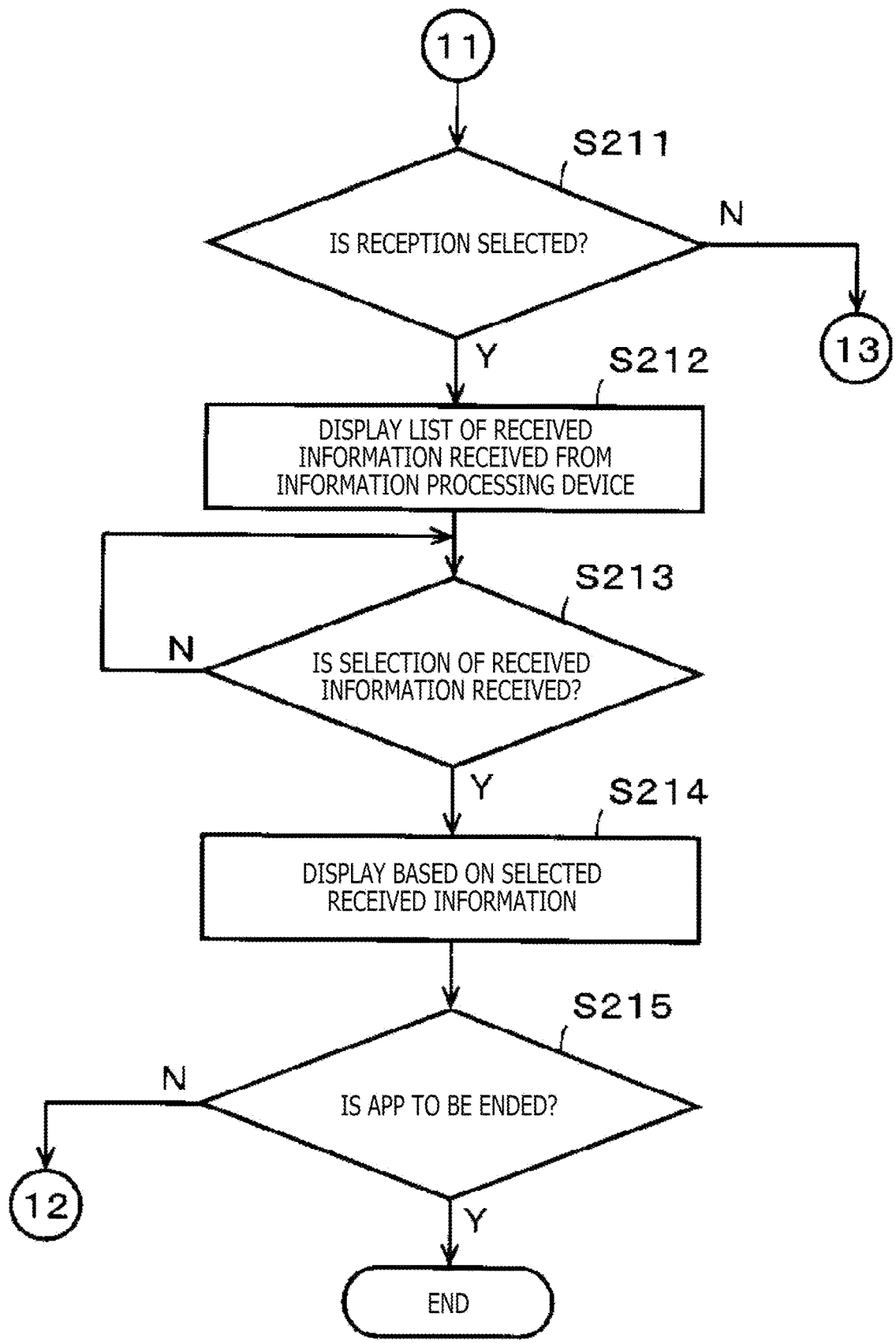
FIG. 16 is a diagram depicting a part of the flowchart of assistance in explaining the example of the flow of the processing of the portable terminal that performs communication with the information processing device constituting the information processing system according to the embodiment of FIG. 1.
Figure 17:
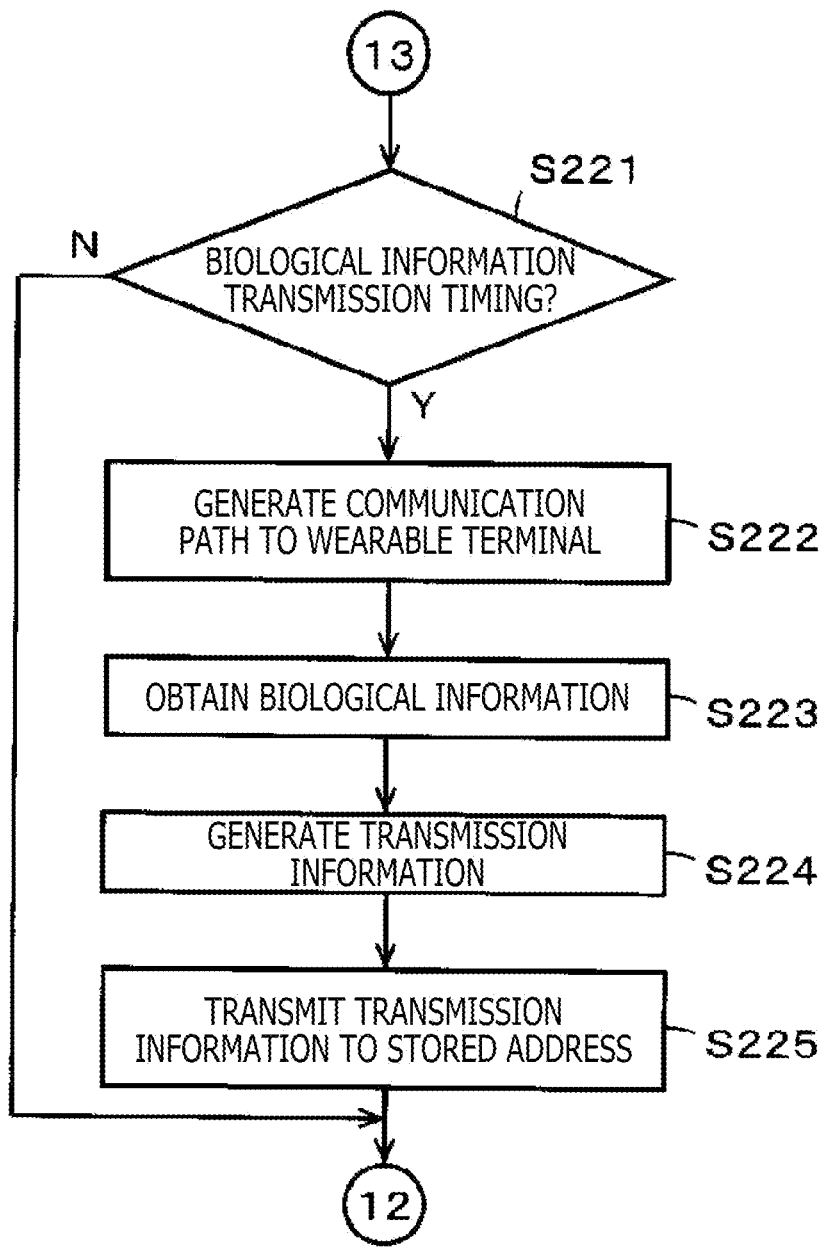
FIG. 17 is a diagram depicting a part of the flowchart of assistance in explaining the example of the flow of the processing of the portable terminal that performs communication with the information processing device constituting the information processing system according to the embodiment of FIG. 1.

FIGS. 15 to 17 are diagrams of assistance in explaining an example of a flow of processing operation performed by the communication control processing circuit 409 in the portable terminals 41 to 44 that communicate with the information processing device 1 according to the present embodiment. Incidentally, the processing of the communication control processing circuit 409 is processing performed by an application program installed on these portable terminals 41 to 44 in advance. The processing is started at a start of FIG. 15 when the user starts the application program. Incidentally, the following description will be made supposing that the control circuit 401 in the configuration of FIG. 6 performs the processing.

The control circuit 401 determines whether or not transmission of an electronic mail addressed to the information processing device 1 is selected by the user (S201 in FIG. 15). When the control circuit 401 determines at S201 that transmission of an electronic mail is selected, the control circuit 401 displays a screen for generating transmission information of the electronic mail on the display screen of the display device 410 (S202), and receives input of the transmission information through the touch panel 411 by the user (S203). In this case, the electronic mail to be sent to the information processing device 1 is assumed to include information notifying a schedule, and the screen for generating the transmission information includes, for example, input fields of a time of the day at which time a return home is scheduled, whether a meal is necessary or not necessary, and the like as fields in specific positions determined in advance.

Then, the control circuit 401 determines whether or not an instruction to complete the input of the transmission information is received from the user (S204). When the control circuit 401 determines that the instruction to complete the input of the transmission information is not received, the control circuit 401 returns the processing to S203, and receives the input of the transmission information until the instruction to complete the input of the transmission information is given from the user.

When the control circuit 401 determines at S204 that the instruction to complete the input of the transmission information is received from the user, the control circuit 401 makes an inquiry as to whether or not to specify a transfer destination, waits for a response from the user, and determines whether or not there is a request to specify a transfer destination (S205). When the control circuit 401 determines at S205 that there is a request to specify a transfer destination, the control circuit 401, for example, displays a list of destinations that can be specified as a transfer destination, and receives a specification of a transfer destination (S206).

Then, the control circuit 401 waits to receive a transmission execution instruction from the user (S207). When the control circuit 401 determines that the transmission execution instruction is received, the control circuit 401 transmits the electronic mail to the stored address of the information processing device 1 (S208).

In addition, when the control circuit 401 determines at S205 that there is no request to specify a transfer destination, the control circuit 401 bypasses the processing of S206, and proceeds to S207, where the control circuit 401 waits to receive the transmission execution instruction from the user. When the control circuit 401 determines that the transmission execution instruction is received, the control circuit 401 transmits the electronic mail to the stored address of the information processing device 1 at S208.

After S208, the control circuit 401 inquires of the user as to whether or not to end the application program of the communication control processing circuit 409, and determines whether or not to end the application program by waiting for a response of the user (S209). When there is no response indicating that the application program is to be ended, the control circuit 401 returns the processing to S201. When the control circuit 401 obtains a response indicating that the application program is to be ended, the control circuit 401 ends this processing routine.

In addition, when the control circuit 401 determines at S201 that transmission is not selected, the control circuit 401 determines whether or not reception of an electronic mail is selected (S211 in FIG. 16). When the control circuit 401 determines that reception of an electronic mail is selected, the control circuit 401 makes list display of received information of electronic mails received from the information processing device 1 (S212). Next, the control circuit 401 waits to receive a selection of received information from the list by the user. When the control circuit 401 determines that a selection of received information is received, the control circuit 401 displays a display based on the selected received information regarding the display screen of the display device 410 (214).

Then, the control circuit 401 inquires of the user as to whether or not to end the application program of the communication control processing circuit 409, and determines whether or not to end the application program by waiting for a response of the user (S215). When there is no response indicating that the application program is to be ended, the control circuit 401 returns the processing to S201. When the control circuit 401 obtains a response indicating that the application program is to be ended, the control circuit 401 ends this processing routine.

In addition, when the control circuit 401 determines at S211 that reception of an electronic mail is not selected, the control circuit 401 determines whether or not the transmission timing of biological information has arrived (S221 in FIG. 17). When the control circuit 401 determines at S221 that the transmission timing of biological information has not arrived, the control circuit 401 returns the processing to S201 in FIG. 15.

Then, when the control circuit 401 determines at S221 that the transmission timing of biological information has arrived, the control circuit 401 generates a communication path to a corresponding one of the wearable terminals 51 to 54 which one is set so as to communicate with the short-range wireless communication circuit 408 (S222), and obtains the biological information of the registration target person wearing the corresponding one of the wearable terminals 51 to 54 (S223).

Next, the control circuit 401 generates transmission information including the biological information (S224), and transmits an electronic mail including the generated transmission information to the stored address of the information processing device 1 (S225). Then, the control circuit 401 returns the processing to S201 in FIG. 15, and repeats the processing at from S201 on down.

Example of Flow of Processing of Meal Condition Detecting Device 7

Figure 18:
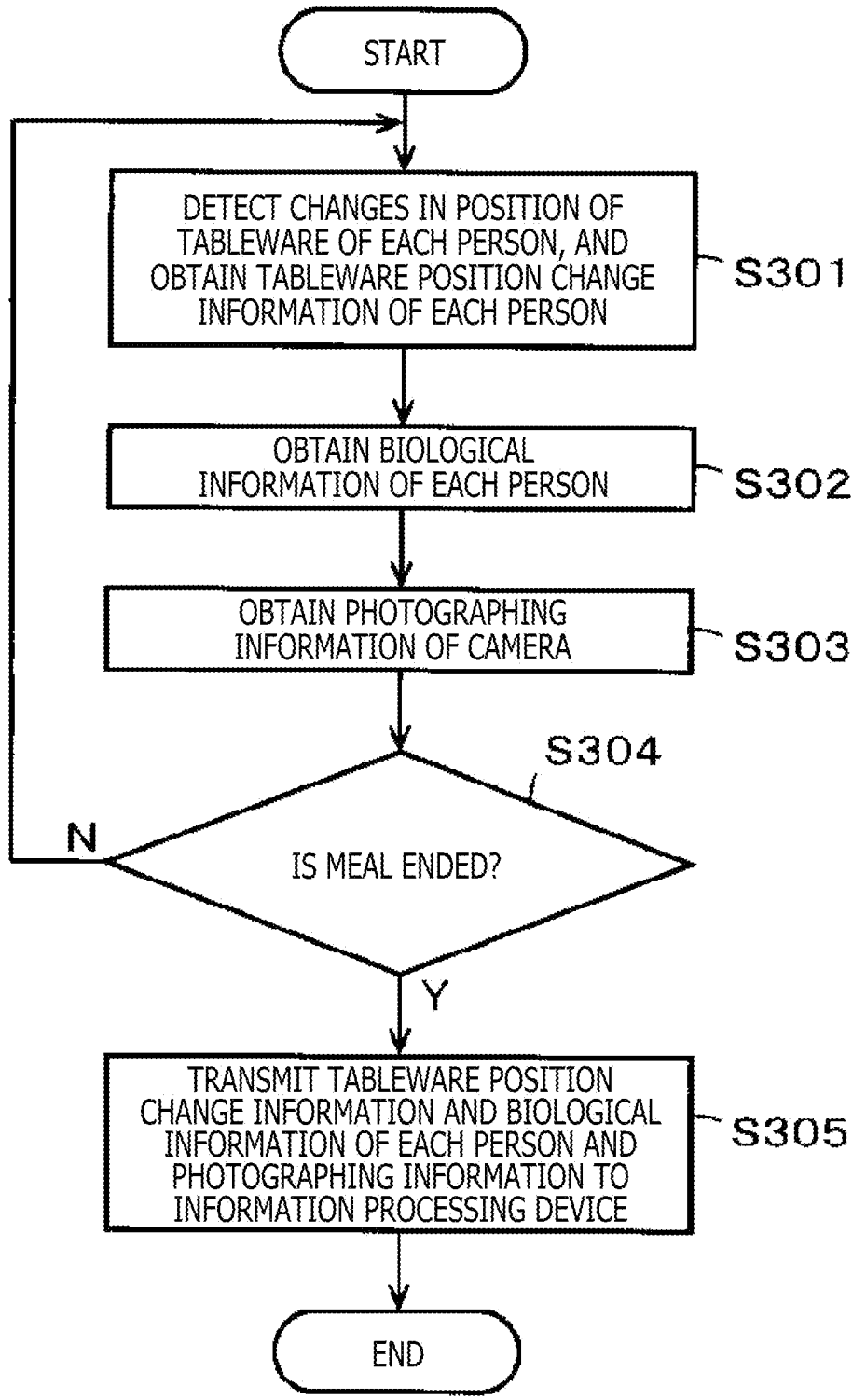
FIG. 18 is a diagram depicting a part of a flowchart of assistance in explaining an example of a flow of processing of the meal condition detecting device that performs communication with the information processing device constituting the information processing system according to the embodiment of FIG. 1.

FIG. 18 is a diagram of assistance in explaining an example of a flow of processing operation performed by the processing control circuit 702 of the meal condition detecting device 7 that performs communication with the information processing device 1 according to the present embodiment. Incidentally, the processing of the processing control circuit 702 is processing performed by an application program installed in advance. The processing is started at a start of FIG. 18 when the user starts the meal condition detecting device 7 at a time of a start of a meal.

The processing control circuit 702 obtains, from the signal transmission and reception processing circuit 701, information regarding changes in position of tableware of each registration target person during the meal on the position detecting sensor 7S (S301). In addition, the processing control circuit 702 obtains the biological information of each registration target person during the meal by the short-range wireless communication circuit 705 (S302). Further, the processing control circuit 702 receives and obtains photographing information from the camera 7CM through the short-range wireless communication circuit 704 (S303).

Next, the processing control circuit 702 determines whether or not the meal is ended by monitoring for an ending instruction of the user (S304). When the processing control circuit 702 determines that the meal is not ended, the processing control circuit 702 returns the processing to S301. In addition, when the processing control circuit 702 determines at S304 that the meal is ended, the processing control circuit 702 transmits the tableware position change information and the biological information of each registration target person and the photographing information of the camera 7CM as information regarding meal conditions to the information processing device 1 through the short-range wireless communication circuit 703 (S305). This ends the processing routine.

Effects of Embodiment

As described above, in the information processing device 1 according to the foregoing embodiment, the display area of the display screen 11D is configured to include the partial display areas AR1 to AR4 associated with the respective communication addresses of the plurality of portable terminals 41 to 44 set and registered in advance as devices that communicate with the information processing device 1. The partial display areas AR1 to AR4 display information received from the portable terminals 41 to 44 with which the partial display areas AR1 to AR4 are associated. In addition, the detection area of the position detecting sensor 13 is configured to include the partial input areas corresponding to the respective partial display areas AR1 to AR4. Writing data input by writing in the partial input areas is transmitted to the portable terminals associated with the corresponding partial display areas AR1 to AR4.

Hence, it is convenient that received information such as schedule information from the users of the portable terminals 41 to 44 associated with the respective partial display areas AR1 to AR4 can be checked by merely viewing the partial display areas AR1 to AR4 on the display screen 11D of the information processing device 1. It is very convenient that information desired to be transmitted can be transmitted to the users of the portable terminals 41 to 44 associated with the partial display areas AR1 to AR4 by performing writing input of the information in the partial input areas corresponding to the partial display areas AR1 to AR4. For example, a message requesting transmission of schedule information can be transmitted to a registration target person who has not sent the schedule information by performing writing input of the message in the partial input area (partial display area) corresponding to the registration target person.

In addition, it is very convenient that in the information processing device 1 according to the foregoing embodiment, a partial display area can be set as a common area, and the writing data of writing input in the common area is transmitted to all of the plurality of portable terminals 41 to 44 set and registered in advance. For example, when writing input of a message requesting transmission of schedule information is performed in the common area, the message can be transmitted to all of the registration target persons.

In addition, the information processing device 1 according to the foregoing embodiment produces an effect of being able to obtain the schedule information, the health state information, and the preference information from the registration target persons, and able to propose appropriate food from the schedule information, the health state information, and the preference information.

In addition, the information processing device 1 according to the foregoing embodiment has another effect of being able to obtain the biological information from each registration target person periodically, and monitor information regarding the health state of each registration target person constantly. Further, the information processing device 1 according to the foregoing embodiment has another effect of being able to deal also with changes in the preferences of each registration target person because the information processing device 1 obtains the preference information of each registration target person on the basis of information regarding meal conditions from the meal condition detecting device 7.

Other Embodiments or Modifications

In the foregoing embodiment, the meal condition detecting device 7 has, on the table 7T, the position detecting sensor 7S having the whole of the top surface of the table 7T as a position detection area. However, a configuration for detecting information regarding changes in position of tableware during a meal of each registration target person is not limited to that using the large-sized position detecting sensor 7S as in the present example.

Figure 19:
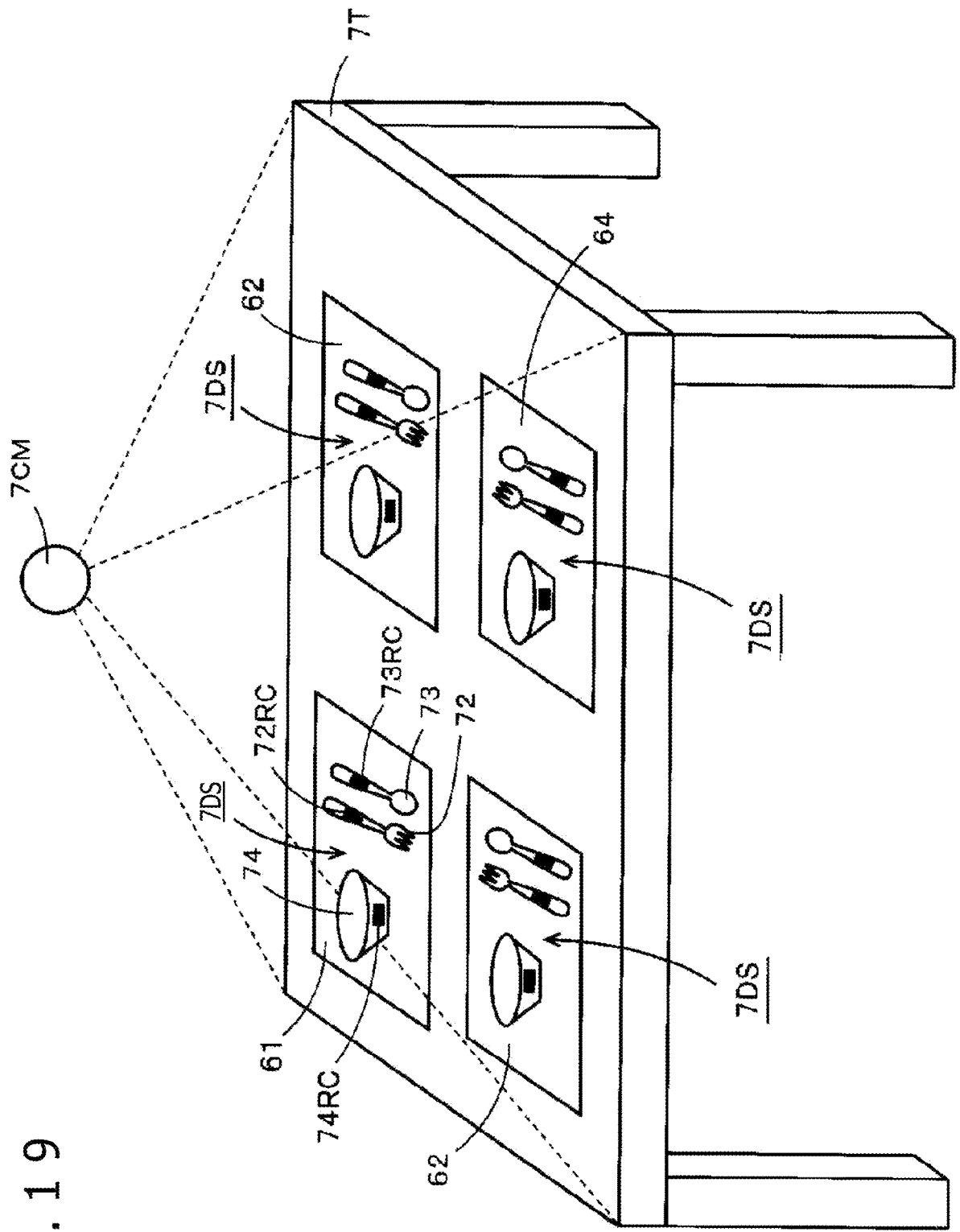
FIG. 19 is a diagram of assistance in explaining another configuration example of the meal condition detecting device that performs communication with the information processing device constituting the information processing system according to the embodiment of FIG. 1.

FIG. 19 depicts a meal condition detecting device in another example. The meal condition detecting device in the present example is different from the meal condition detecting device 7 in the foregoing example in terms of the configuration of the position detecting sensor for detecting movement of the tableware group 7DS.

Specifically, in the meal condition detecting device in the example of FIG. 19, luncheon mat devices 61 to 64 on which to mount food are prepared for the respective registration target persons. Each of the luncheon mat devices 61 to 64 is provided with a position detecting sensor of the electromagnetic induction type in the present example and a signal transmission and reception processing circuit (similar to the signal transmission and reception processing circuit 701 in the example of FIG. 9) on the back side of a mat on which to mount food (luncheon mat). The position detection output of each of the luncheon mat devices 61 to 64 is given device identification information (device ID). In the meal condition detecting device in the example of FIG. 19, each of the luncheon mat devices 61 to 64 is configured to be connected to the processing control circuit 702 in place of the position detecting sensor 7S and the signal transmission and reception processing circuit 701 in the example of FIG. 8. Also in the meal condition detecting device in the case of the example of FIG. 19, the short-range wireless communication circuits 703, 704, and 705 are similarly connected to the processing control circuit 702.

Hence, in the meal condition detecting device in the case of the example of FIG. 19, the processing control circuit 702 receives the position detection output from the luncheon mat devices 61 to 64 as information regarding changes in position of the tableware group 7DS with regard to each registration target person. Then, the processing control circuit 702 transmits the received information regarding the changes in position of the tableware group 7DS of each registration target person, the biological information of each registration target person, and the photographing information of the camera 7CM to the information processing device 1.

In the meal condition detecting device in the example of FIG. 19, it suffices to lay, on the table 7T, luncheon mat devices for registration target persons that take a meal among the luncheon mat devices 61 to 64.

Incidentally, while the luncheon mat devices 61 to 64 have a configuration in which a position detecting sensor is disposed on the back side of a luncheon mat in the description of the example of FIG. 19 described above, the luncheon mat may be a fabric, and a conductor (covered conductor) constituting the position detecting sensor may be woven into the fabric. In this case, the luncheon mat may be created by creating the fabric using a soft fiber for a covering portion of the covered conductor, or the luncheon mat may be created by creating the fabric using a pair of the covered conductor and a yarn of fiber.

In addition, in the meal condition detecting device in the example of FIG. 19, a configuration is also possible in which a position detecting circuit including a position detecting sensor and a signal transmission and reception processing circuit is provided in a tray for each registration target person, a table for individual use, or the like rather than the luncheon mat.

It is to be noted that, while description has been made such that information that can be displayed such as text information and image information is set as a target of communication between the information processing device 1 according to the foregoing embodiment and the portable terminals, audio information may also, of course, be included as a target of communication. In that case, the information processing device 1 may be provided with a circuit for voice communication with a telephone function of the portable terminal, and provided with a function of a telephone transmitter (microphone) and a function of a telephone receiver (speaker).

In addition, a configuration is possible in which the information processing device 1 according to the foregoing embodiment is provided with two wireless communication circuits for communicating with portable terminals, and information communication is performed between two portable terminals via the information processing device 1 by using those two wireless communication circuits. For example, when a desire to communicate with "Taro" occurs, for example, while the "father" is communicating with the information processing device 1 on the portable terminal 41 by using one of the two wireless communication circuits, and the "father" makes a request to the information processing device 1 with "Taro" as a communication counterpart, the information processing device 1 can connect a communication path to the portable terminal 44 of "Taro" by the other available wireless communication circuit, transmit information sent from the portable terminal 41 of the "father" to the portable terminal 44 of "Taro," and transmit information sent from the portable terminal 44 of "Taro" to the portable terminal 41 of the "father."

In addition, while the information processing device 1 according to the foregoing embodiment has a configuration in which the marker-equipped position indicator 2 is used as a position indicator indicating a position on the position detecting sensor 13, and a transparent panel is provided on the display screen 11D, the position indicator may not have a function of ink writing on the front surface 12*a* of the transparent panel 12.

In addition, while a position detecting sensor of an electromagnetic induction coupling type is used in the foregoing embodiment, the position indicator may, for example, be formed as an active capacitive type that transmits a signal for position detection to the position detecting sensor, and the position detecting sensor may be configured as a capacitive coupling type.

In addition, while description has been made by taking as an example a case of electronic mail communication between the information processing device 1 and the portable terminals in the foregoing embodiment, it is needless to say that communication between the information processing device according to the present disclosure and the portable terminals is not limited to electronic mail communication.

The portable terminals are not limited to advanced mobile telephone terminals, but may be any terminals as long as the terminals include a display device and a control circuit and have a communicating function.

It is to be noted that the embodiment of the present disclosure is not limited to the foregoing embodiments, and that various changes can be made without departing from the spirit of the present disclosure.

What is claimed is:

1. An information processing system comprising:
   an information processing device;
   a food material stock managing device disposed in a food material storage device which, in operation, stores food materials; and
   a meal condition detecting device which, in operation, detects behavior of a target person while the target person is eating provided food,
   the information processing device including:
      a position detecting circuit which, in operation, detects a position indicated by a position indicator;
      a display device including a display screen,
      wherein the display screen of the display device and a position detecting sensor of the position detecting circuit are arranged in a state of being superposed on each other, and a display area of the display screen is an input area for position indication by the position indicator on the position detecting sensor,
      wherein a plurality of partial input areas superposed on and corresponding to a plurality of partial display areas of the display screen is set for the input area of the position detecting sensor,
      wherein in response to the position detecting circuit detecting input of the position indicated by the position indicator in one of the plurality of partial input areas, input by the position indicator and detected by the position detecting circuit is transmitted to a portable terminal corresponding to one of the partial display areas corresponding to the one of the plurality of partial input areas,
      wherein a transparent cover member is disposed on a top surface of the display screen of the display device of the information processing device, and
      wherein the position indicator includes a writing device which, in operation, performs ink writing on the cover member, and an interaction circuit which, in operation, exchanges a signal with the position detecting sensor;
      a first communication circuit which, in operation, communicates with a portable terminal of the target person;
      a second communication circuit which, in operation, communicates with the food material stock managing device;
      a third communication circuit which, in operation, communicates with the meal condition detecting device;
      a processor coupled to the first communication circuit, the second communication circuit, and the third communication circuit; and
      a memory storing instructions that, when executed by the processor, cause the information processing device to generate information regarding proposed food to be provided to the target person based on information obtained from the first communication circuit, information obtained from the second communication circuit, and information obtained from the third communication circuit, and display the information regarding the proposed food to be provided to the target person on the display screen of the display device.

2. The information processing system according to claim 1,
   wherein the instructions stored by the memory, when executed by the processor, cause the information processing device to:
      obtain information regarding a schedule of the target person from the information received from the portable terminal of the target person, the information from the portable terminal of the target person being received by the first communication circuit,
      obtain a health state of the target person determined based on biological information of the target person, the biological information being included in information received from the portable terminal of the target person, the information from the portable terminal of the target person being received by the first communication circuit,
      obtain information regarding the food materials stored in the food material storage device based on the information received from the food material stock managing device by the second communication circuit, and
      generate preference information of the target person with regard to the provided food based on the information received from the meal condition detecting device by the third communication circuit, and
      display the information regarding the proposed food to be provided to the target person on the display screen of the display device based on the information regarding the schedule of the target person obtained from the information received from the food material stock managing device, information regarding the health state of the target person determined based on the biological information included in the information received from the portable terminal of the target person, the information regarding the food materials obtained based on the information received from the food material stock managing device, and the preference information of the target person generated based on the information received from the meal condition detecting device.

3. The information processing system according to claim 2, wherein:
   the instructions stored by the memory, when executed by the processor, cause the information processing device to transmit the information regarding the schedule, the information regarding the health state, information regarding the food materials, and the preference information to a food recipe providing server through a communication network, and display, on the display screen of the display device, recipe information of the food to be provided, the recipe information being sent from the food recipe providing server.

4. The information processing system according to claim 2,
   wherein the instructions stored by the memory, when executed by the processor, cause the information processing device to transmit the biological information to a health state detecting server through a communication network, and obtain information regarding the health state of the target person from the health state detecting server.

5. The information processing system according to claim 2, wherein the instructions stored by the memory, when executed by the processor, cause the information processing device to transmit the information received from the meal condition detecting device to a preference information detecting server through a communication network, and accumulate the preference information of the target person, the preference information being sent from the preference information detecting server.

6. The information processing system according to claim 1,
wherein the instructions stored by the memory, when executed by the processor, cause the information processing device to:
set a plurality of partial display areas formed by regions different from each other in a display area of the display screen of the display device,
manage each of the plurality of partial display areas in association with a respective one of a plurality of portable terminals of target persons, and
perform control such that each of the partial display areas displays information communicated through the first communication circuit to the respective one of the portable terminals.

7. The information processing system according to claim 1,
wherein the food material stock managing device includes:
a loaded food material detecting circuit which, when a food material is loaded into the food material storage device, detects the food material loaded into the food material storage device,
an unloaded food material detecting circuit which, when a stored food material is unloaded from the food material storage device, detects the food material unloaded from the food material storage device, and
a transmitting circuit which, in operation, transmits to the information processing device information regarding stored stock food materials based on a detection result of the loaded food material detecting circuit and a detection result of the unloaded food material detecting circuit.

8. The information processing system according to claim 7,
wherein the instructions stored by the memory, when executed by the processor, cause the information processing device to order a particular food material, when the particular food material is determined not to be included in the stored stock food materials based on the information regarding the food materials obtained based on the information received from the food material stock managing device.

9. The information processing system according to claim 1,
wherein the meal condition detecting device includes:
a position detecting sensor disposed on an upper surface of a table,
tableware including a position indicating circuit which, in operation, indicates a position in a detection area of the position detecting sensor by performing signal interaction with the position detecting sensor,
a position detecting circuit which, in operation, detects a position and movement of the tableware on the position detecting sensor, and
a transmitting circuit which, in operation, transmits position information detected by the position detecting circuit to the information processing device.

10. The information processing system according to claim 9, wherein:
the position indicating circuit included in the tableware stores identification information that identifies the target person,
the position detecting circuit detects the position and movement of the tableware in association with the identification information, and
the identification information is added to the position information transmitted to the information processing device through the transmitting circuit.

11. The information processing system according to claim 9, wherein:
the target person wears a wearable terminal which, in operation, detects biological information of the target person, and
the meal condition detecting device obtains the biological information by communicating with the wearable terminal, and transmits the biological information obtained to the information processing device through the transmitting circuit.

12. The information processing system according to claim 9,
wherein the position detecting sensor and the position detecting circuit included in the meal condition detecting device form an electromagnetic induction coupling system.

13. The information processing system according to claim 9,
wherein the position detecting sensor and the position detecting circuit included in the meal condition detecting device form a capacitive coupling system.

14. The information processing system according to claim 1,
wherein the meal condition detecting device includes:
a camera which, in operation, generates image data corresponding to an image of an upper surface of a table and the target person surrounding the table, and
a transmitting circuit which, in operation, transmits the image data to the information processing device.

15. The information processing system according to claim 1, wherein:
the target person wears a wearable terminal which, in operation, detects biological information of the target person, and
the portable terminal of the target person periodically transmits the biological information obtained from the wearable terminal to the information processing device.

16. The information processing system according to claim 1,
wherein the meal condition detecting device includes:
a position detecting sensor in a table mat for the target person;
tableware including a position indicating circuit which, in operation, indicates a position in a detection area of the position detecting sensor by performing signal interaction with the position detecting sensor;
a position detecting circuit which, in operation, detects a position and movement of the tableware on the position detecting sensor, and
a transmitting circuit which, in operation, transmits position information detected by the position detecting circuit to the information processing device.

17. An information processing device in an information processing system including a food material stock managing device disposed in a food material storage device which, in operation, stores food materials, a meal condition detecting device which, in operation, detects behavior of a predetermined target person while the target person is eating provided food, the information processing device comprising:
- a position detecting circuit which, in operation, detects a position indicated by a position indicator;
- a display device including a display screen,
- wherein the display screen of the display device and a position detecting sensor of the position detecting circuit are arranged in a state of being superposed on each other, and a display area of the display screen is an input area for position indication by the position indicator on the position detecting sensor,
- wherein a plurality of partial input areas superposed on and corresponding to a plurality of partial display areas of the display screen is set for the input area of the position detecting sensor,
- wherein in response to the position detecting circuit detecting input of the position indicated by the position indicator in one of the plurality of partial input areas, input by the position indicator and detected by the position detecting circuit is transmitted to a portable terminal corresponding to one of the partial display areas corresponding to the one of the plurality of partial input areas,
- wherein a transparent cover member is disposed on a top surface of the display screen of the display device of the information processing device, and
- wherein the position indicator includes a writing device which, in operation, performs ink writing on the cover member, and an interaction circuit which, in operation, exchanges a signal with the position detecting sensor;
- a first communication circuit which, in operation, communicates with a portable terminal carried by the target person;
- a second communication circuit which, in operation, communicates with the food material stock managing device;
- a third communication circuit which, in operation, communicates with the meal condition detecting device;
- a processor coupled to the first communication circuit, the second communication circuit, and the third communication circuit; and
- a memory storing instructions that, when executed by the processor, cause the information processing device to generate information regarding proposed food to be provided to the target person based on information obtained from the first communication circuit, information obtained from the second communication circuit, and information obtained from the third communication circuit, and display the information regarding the proposed food to be provided to the target person on the display screen of the display device.

18. The information processing device according to claim 17,
wherein the instructions stored by the memory, when executed by the processor, cause the information processing device to:
- obtain information regarding a schedule of the target person from the information received from the portable terminal of the target person, the information from the portable terminal of the target person being received by the first communication circuit;
- obtain a health state of the target person determined based on biological information of the target person, the biological information being included in information received from the portable terminal of the target person, the information received from the portable terminal of the target person being received by the first communication circuit;
- obtain information regarding the food materials stored in the food material storage device based on the information received from the food material stock managing device by the second communication circuit; and
- generate preference information of the target person with regard to the provided food based on the information received from the meal condition detecting device by the third communication circuit,
- display the information regarding the proposed food to be provided to the target person on the display screen of the display device based on the information regarding the schedule of the target person obtained from the information received from the food material stock managing device, information regarding the health state of the target person determined based on the biological information included in the information received from the portable terminal of the target person, the information regarding the food materials obtained based on the information received from the food material stock managing device, and the preference information of the target person generated based on the information received from the meal condition detecting device.

* * * * *